(12) United States Patent
Yamaguchi et al.

(10) Patent No.: US 8,139,847 B2
(45) Date of Patent: Mar. 20, 2012

(54) DEFECT INSPECTION TOOL AND METHOD OF PARAMETER TUNING FOR DEFECT INSPECTION TOOL

(75) Inventors: Kohei Yamaguchi, Hitachinaka (JP); Kenji Obara, Kawasaki (JP); Takehiro Hirai, Ushiku (JP)

(73) Assignee: Hitachi High-Technologies Corporation, Tokyo (JP)

( * ) Notice: Subject to any disclaimer, the term of this patent is extended or adjusted under 35 U.S.C. 154(b) by 483 days.

(21) Appl. No.: 12/370,784

(22) Filed: Feb. 13, 2009

(65) Prior Publication Data

US 2009/0222753 A1 Sep. 3, 2009

(30) Foreign Application Priority Data

Mar. 3, 2008 (JP) .................................. 2008-051631

(51) Int. Cl.
*G06K 9/00* (2006.01)
(52) U.S. Cl. ...................................................... 382/149
(58) Field of Classification Search .................. 382/145, 382/147, 149; 250/307, 310–311
See application file for complete search history.

(56) References Cited

U.S. PATENT DOCUMENTS

| | | | |
|---|---|---|---|
| 7,236,651 B2 * | 6/2007 | Ishitani et al. | 250/311 |
| 7,570,797 B1 * | 8/2009 | Wang et al. | 382/145 |
| 2002/0009220 A1 | 1/2002 | Tanaka | |
| 2004/0228515 A1 * | 11/2004 | Okabe et al. | 382/145 |
| 2005/0264833 A1 | 12/2005 | Hiraoka et al. | |
| 2006/0284081 A1 | 12/2006 | Miyamoto | |
| 2007/0181807 A1 * | 8/2007 | Fukuda et al. | 250/310 |
| 2008/0226153 A1 * | 9/2008 | Ono et al. | 382/149 |
| 2008/0279444 A1 * | 11/2008 | Fischer et al. | 382/145 |

FOREIGN PATENT DOCUMENTS

| | | |
|---|---|---|
| JP | 2004-239728 | 8/2004 |
| JP | 2004-294358 A | 10/2004 |
| JP | 2005-258541 A | 9/2005 |
| JP | 2007-003212 | 1/2007 |
| JP | 2007-198968 | 8/2007 |
| WO | WO 01/41068 A1 | 6/2001 |

OTHER PUBLICATIONS

Japanese Office Action issued in Japanese Patent Application No. JP 2008-051631 dated Jun. 1, 2010.

* cited by examiner

*Primary Examiner* — Kara E Geisel
(74) *Attorney, Agent, or Firm* — McDermott Will & Emery LLP

(57) ABSTRACT

An inspection method and an inspection tool are capable of detecting a defect on a specimen. More particularly, the examples relate to an inspection method and an inspection tool for easily setting an inspection condition to be used in a defect inspection of an inspected pattern such as a semiconductor wafer, a liquid crystal display, or a photomask.

9 Claims, 18 Drawing Sheets

FIG. 8

TEST RESULTS

ID 000001

| ParamB | 1 | 2 | 3 | 4 | 5 | 6 |
|---|---|---|---|---|---|---|
| ParamA 1 | | | 801 | | | |
| 2 | | | | | | |
| 3 | | | | | | |

TEST RESULTS

ID 000001

DEFECT INSPECTION TOOL AND METHOD OF PARAMETER TUNING FOR DEFECT INSPECTION TOOL

BACKGROUND OF THE INVENTION

1. Field of the Invention

The present invention relates to a pattern inspection technique for detecting defects and particles of an inspected pattern, and especially relates to an inspection method and an inspection tool for easily setting an inspection condition to be used in defect inspection of the inspected pattern such as a semiconductor wafer, a liquid crystal display, or a photomask.

2. Description of the Related Art

An inspection process is indispensable in order to improve yield of a semiconductor device, and the inspection tool for detecting abnormality of the wafer and specifying a cause of reduction in yield is essential for a production process of the semiconductor device. Also, it is required to speed up the inspection for an efficient inspection, and it is desired to inspect many points in a short time. Contents of the inspection are wide-ranging such as a film thickness, a pattern pitch, an appearance quality, the particles, the defect, and an analysis of components thereof. In order to inspect the contents accurately and rapidly, it is necessary to accurately and fully utilize the inspection tool corresponding to the objects. Therefore, the tool easily used in a short period even by a user unfamiliar with the tool is desired.

In such a tool, however, it is necessary to appropriately set many parameters for setting an operation condition in most cases. In addition, even if a parameter visually judged without uncomfortable feeling such as brightness and contrast is to be set, it is necessary to set a parameter using a numerical value in an actual tool, for example, to set a numerical value 5 in a range from 0 to 10. Other than this example, setting means and contents are wide-ranging. For example, some parameters are represented by a format other than a numerical value such as Normal, Medium and Hard, and other parameters are set by a length of a colored portion by using a slide bar. In many cases, the relationships between a name of the parameter and an actual effect is not understood at one sight. Therefore, in order to appropriately set them, the contents of the parameters should be sufficiently comprehended. However, the contents of the parameters are often the contents inherent to the tool, and therefore the user should be skilled in handling the tool in advance and study the contents of the parameter. This is especially an obstacle for a user who does not use the tool regularly or a beginner to use the tool efficiently.

Therefore, in order to remove the obstacle and to use the tool easily, the method of displaying the set inspection parameters and the results thereof as a list to make them visually understandable is invented (refer to, for example, JP2004-294358A1). According to this technique, the results calculated with each combination of all of the parameters for all of the defect images are displayed as a list. However, the user should select an optimal parameter group from the parameter groups displayed as a list, in consideration of a defect detection number and the defect image. Therefore, a high level of skill is necessary on such selection.

SUMMARY OF THE INVENTION

Setting of the parameter is based on trial and error in which effects are set after confirmed one by one. The setting requires high technique and is significantly inefficient. The present invention is to provide the inspection method and the inspection tool capable of solving such a problem and of setting the parameter (hereinafter, referred to as an inspection parameter) required for detecting the defect easily.

In order to solve the problem, a defect inspection tool according to the present invention comprises: an image obtaining unit for obtaining an image by applying an electron beam to a specimen; an image processing unit for performing a calculation process by using each predetermined inspection parameter group based on the image obtained by the image obtaining unit; and a parameter tuning unit for performing a process to determine an effective inspection parameter group from calculation results by the calculation process and narrowing down an inspection parameter group range by repeating the process for a plurality of images obtained by the image obtaining unit, wherein a defect of the image obtained by the image obtaining unit is detected by using the inspection parameter group narrowed down by the parameter tuning unit. In the present invention, it becomes possible for even the user who does not understand the detailed contents of each parameter to easily tune (narrow down) complicated inspection parameter groups which are used when detecting the defect.

Also, a defect inspection tool according to another embodiment of the present invention comprises: an image obtaining unit for obtaining an image by applying an electron beam to a specimen; an image processing unit for performing a calculation process by using each predetermined inspection parameter group based on the image obtained by the image obtaining unit to detect each defect detection image for each inspection parameter group; a display unit for displaying a list of each defect detection image detected by the image processing unit; an input unit for selectively inputting one defect detection image from each defect detection image displayed as a list on the display unit; and a parameter tuning unit for performing a process to determine an effective inspection parameter group range from each defect detection image detected by the image processing unit based on the defect detection image selectively inputted by the input unit and narrowing down the inspection parameter group by repeating the process for a plurality of images obtained by the image obtaining unit, wherein a defect of the image obtained by the image obtaining unit is detected by using the inspection parameter group narrowed down by the parameter tuning unit. In the present invention, it becomes possible for even the user who does not understand the detailed contents of each parameter to easily tune (narrow down) the complicated inspection parameter groups which are used when detecting the defect, by performing a simple input to select one defect detection image from each defect detection images displayed as a list for the calculation results about a plurality of images. Meanwhile, to display the list display by the GUI allows easier selective input.

Also, a defect inspection tool according to yet another embodiment of the present invention comprises: an image obtaining unit for obtaining an image by applying an electron beam to a specimen; an image processing unit for performing a calculation process using each predetermined inspection parameter group based on the image obtained by the image obtaining unit to detect calculation results for each inspection parameter group; an input unit for teaching a defect area included in the image based on the image obtained by the image obtaining unit; and a parameter tuning unit for performing a process to determine an effective inspection parameter group range from the calculation results detected by the image processing unit based on the defect area taught by the input unit and narrowing down the inspection parameter group range by repeating the process for a plurality of images obtained by the image obtaining unit, wherein a defect of the image obtained by the image obtaining unit is detected by using the inspection parameter group narrowed down by the parameter tuning unit. In the present invention, it becomes possible for even the user who does not understand the detailed contents of each parameter to teach by extracting the defect area of the defect portion by the image processing by a simple input to teach the defect area of the defect portion included in the image (images by secondary electron or images by back scattered electron) displayed on the GUI, such as to draw a figure enclosing the defect portion by the input unit, to draw the defect area of the defect portion by the input unit, or to indicate the defect portion by the input unit, and to easily tune (narrow down) the complicated inspection parameter groups used when detecting the defect by performing the process for the defect portion of a plurality of images.

Meanwhile, in the present invention, it is advisable to provide various display means and functions to make the selective input and the teaching by the input unit easier, such as to provide means for synthesizing the image obtained by the image obtaining unit with each defect detection image, which is the calculation result for each inspection parameter group obtained by the calculation process by the image processing unit based on the image to display, and for simultaneously displaying the calculation result for another image, and to provide means for displaying the selected calculation result or the like in an enlarged manner. In addition, it is advisable that the display means is the GUI at that time.

Also, a tuning method of the inspection parameter group of the present invention used when detecting the defect in the defect inspection tool is a method of tuning the parameter by the similar method with the narrowing down of the inspection parameter by the parameter tuning unit in the inspection tool of the present invention.

That is to say, the tuning method of the inspection parameter group according to the present invention comprises: an image obtaining step of obtaining an image by applying an electron beam to a specimen; a step of performing a calculation process by using each predetermined inspection parameter group based on the image obtained by the step; a step of determining an effective inspection parameter group from calculation results by the calculation process; and a step of narrowing down (tuning) an inspection parameter group range by repeating the step of determining the effective inspection parameter group for a plurality of images obtained by the image obtaining step.

Also, the tuning method according to another embodiment of the present invention comprises: an image obtaining step of obtaining an image by applying an electron beam to a specimen; a detecting step of performing a calculation process by using each predetermined inspection parameter group based on the image obtained by the image obtaining step, and detecting each defect detection image for each inspection parameter group; a displaying step of displaying a list of each defect detection image detected by the detecting step; a selecting step of selecting one defect detection image from each of the defect detection images displayed as a list; a step of determining an effective inspection parameter group range from each defect detection image detected by the detecting step based on the selected defect detection image; and a step of narrowing down the inspection parameter group by repeating the step for a plurality of images obtained by the image obtaining step.

Further, the tuning method according to another embodiment of the present invention comprises: an image obtaining step of obtaining an image by applying an electron beam to a specimen; a detecting step of performing a calculation process by using each predetermined inspection parameter group based on the image obtained by the image obtaining step to detect calculation results for each inspection parameter group; a teaching step of teaching a defect area included in the image based on the image obtained by the image obtaining step; a step of determining an effective inspection parameter group range from the calculation results detected by the detecting step based on the defect area taught by the teaching step; and a step of narrowing down the inspection parameter group by repeating the step for a plurality of images obtained by the image obtaining step.

The methods of tuning the inspection parameter according to the present invention allow the user who does not understand the detailed contents of each parameter to easily tune (narrow down) the complicated inspection parameter groups used when detecting the defection by the simple input, as in the case of the defect detection tool according to the present invention.

BRIEF DESCRIPTION OF THE DRAWINGS

FIG. 8 is a display chart of the GUI showing an example to overlay display only a portion of the image displayed as a list;

FIG. 11 is a display chart of the GUI showing an example of displaying by providing three inspection parameters;

Figure 15:
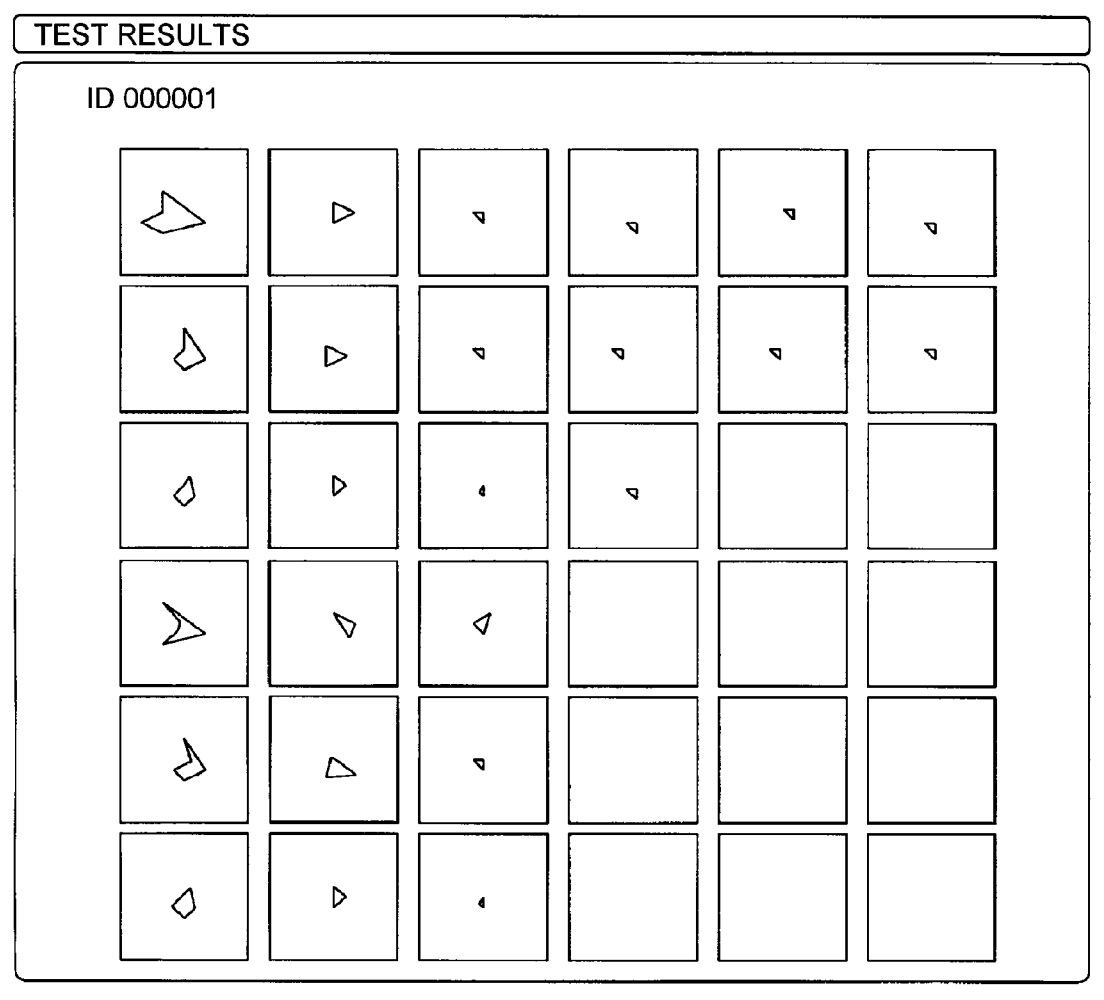

FIG. 15 is a display chart of the GUI to display the detection results as a list while not displaying name and numerical value of the parameter;

DETAILED DESCRIPTION OF THE PREFERRED EMBODIMENTS

Hereinafter, an embodiment of a defect inspection tool of the present invention for detecting a defect on a surface of a semiconductor wafer and a method of tuning an inspection parameter used when detecting the defect in the defect inspection tool will be described, however, this is merely one example of the present invention and the present invention is not limited to the embodiment to be described below.

Figure 1:
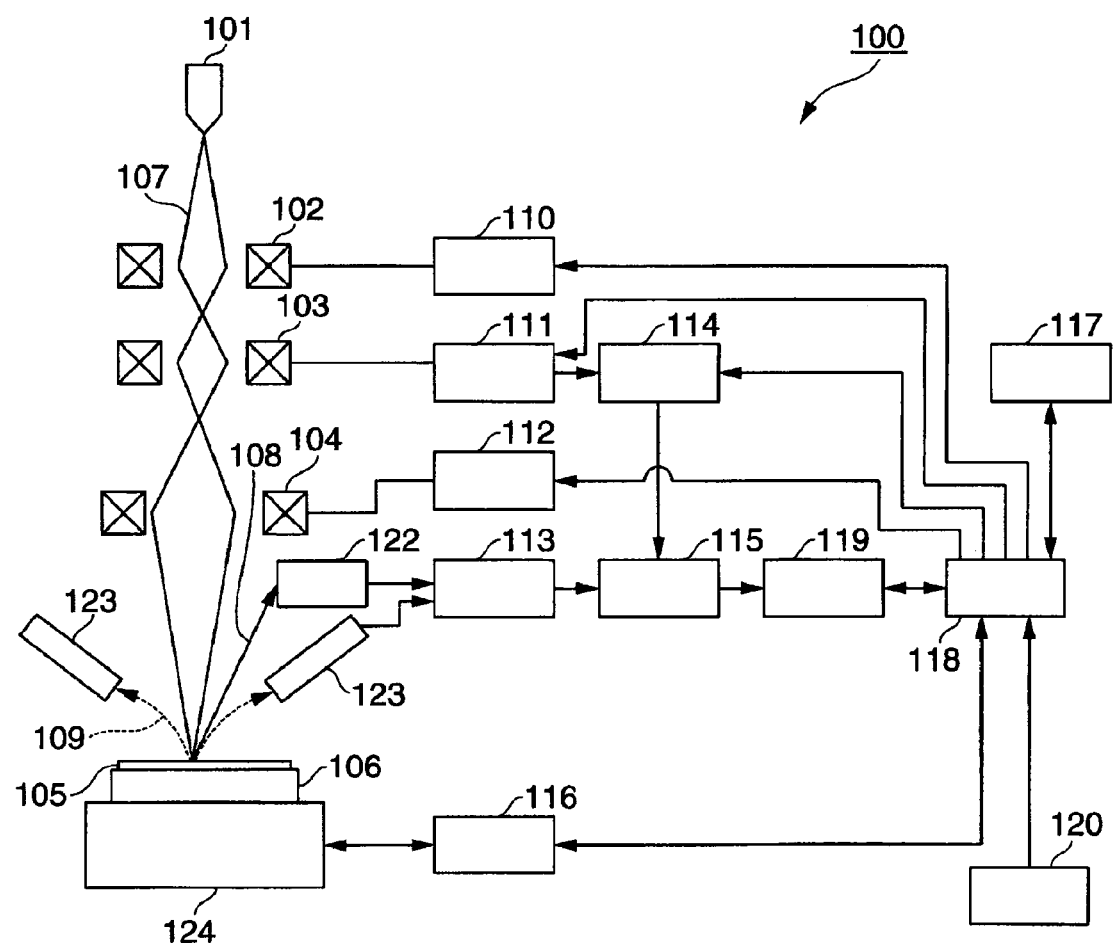
FIG. 1 is a configuration schematic diagram showing one example of a defect inspection tool of the present invention.

FIG. 1 is a schematic diagram showing a configuration example of a defect inspection tool 100 of the present invention. The defect inspection tool 100 of the present invention is composed of an electron gun 101 for emitting an electron beam 107, a lens 102 for converging the electron beam 107, a deflector 103 for deflecting the electron beam 107, an objective lens 104 for converging the electron beam 107, a specimen stage 106 on which a specimen 105 is placed, a secondary electron detector 122 and backscattered electron detectors 123 for detecting a secondary electron and a backscattered electron generated by applying the electron beam 107 to the specimen 105, a motion stage 124 for moving the specimen stage 106, and the like. The backscattered electron detectors 123 are placed at positions opposed to each other in a straight line for imaging a dual shadow image. In addition, they are arranged in a column (not shown) and may be maintained in a vacuum by a vacuum pump (not shown).

The electron beam 107 emitted from the electron gun 101 is converged by the lens 102, two-dimensionally scanned and deflected by the deflector 103, then converged by the objective lens 104 and applied to the specimen 105. When the electron beam 107 is applied to the specimen 105, a secondary electron 108 and a backscattered electron 109 according to a shape and a material of the specimen 105 are generated. The secondary electron 108 and the backscattered electron 109 are detected by the secondary electron detector 122 and the backscattered electron detector 123, amplified by an amplifier (not shown), and then, converted to a digital value by an analog/digital converter 113. Signals from the backscattered electron detectors 123 are used for forming an L image and an R image, which are images by backscattered electron, and a signal from the secondary electron detector 122 is used for forming an S image, which is an image by secondary electron. Data converted to the digital value is stored in an image memory 115. At that time, an address control circuit 114 generates an address synchronized with a scan signal of the electron beam 107 as an address of image data stored in the image memory 115. Also, the image memory 115 occasionally transmits the stored image data to image processing means 119.

The image processing means 119 transmits the transmitted image data to display means 117 through controlling means 118, and performs a calculation process based on the image data to perform a process such as defect extraction. Herein, the defect extraction (detection) process is performed by executing a comparison operation between the transmitted image data and another image data obtained from a pattern corresponding to the image data. Also, the inspection parameter for defect detection performs the calculation process for each predetermined parameter group (or this may be optionally set by a user). When four parameters are set for a parameter A and five parameters are set for a parameter B, for example, the calculation process is performed for a total of 20 parameter groups. The image processing means 119 transmits the calculation results to the display means 117 through the controlling means 118. The display means 117 displays a list of the calculation results and displays the image data transmitted from the image processing means 119. The user may selectively input an appropriate image from images displayed as a list on the display means 117 by input means 120. Herein, the display means 117 is a graphical user interface (GUI) and displayed information is graphically displayed. In addition, a variety of input devices such as a keyboard, a mouse, a pen-type input device, and a touch panel, may be applied as the input means 120.

Meanwhile, the inspection parameter is a parameter, which is required to be set for appropriately processing the image data transmitted from the image memory 115 by the image processing means 119, and is a threshold for binarizing for binary extracting only a defect portion from the transmitted image data, a denoising threshold for removing an area of minute area unrelated to the defect as noise, and a parameter for tuning deterioration in sensitivity at an edge of the specimen.

The lens 102, the deflector 103, and the objective lens 104 are controlled by control signals from a lens control circuit 110, a deflection control circuit 111, and an objective lens control circuit 112, respectively, and a focal position and a deflection amount of the electron beam 107 are controlled. Thereby, it is possible to adjust such that the electron beam 107 is applied to an appropriate position with respect to the specimen 105. Also, the motion stage 124 on which the specimen stage 106 is placed may be two-dimensionally parallelly moved by the control signal from a mechanical control circuit 116. Therefore, the specimen 105 held by the specimen stage 106 may also be two-dimensionally parallelly moved, thereby controlling the position to scan the electron beam 107 over the specimen 105. Meanwhile, the lens control circuit 110, the deflection control circuit 111, the objective lens control circuit 112, and a mechanism control circuit 116 are controlled by the signals from the controlling means 118.

Figure 2:
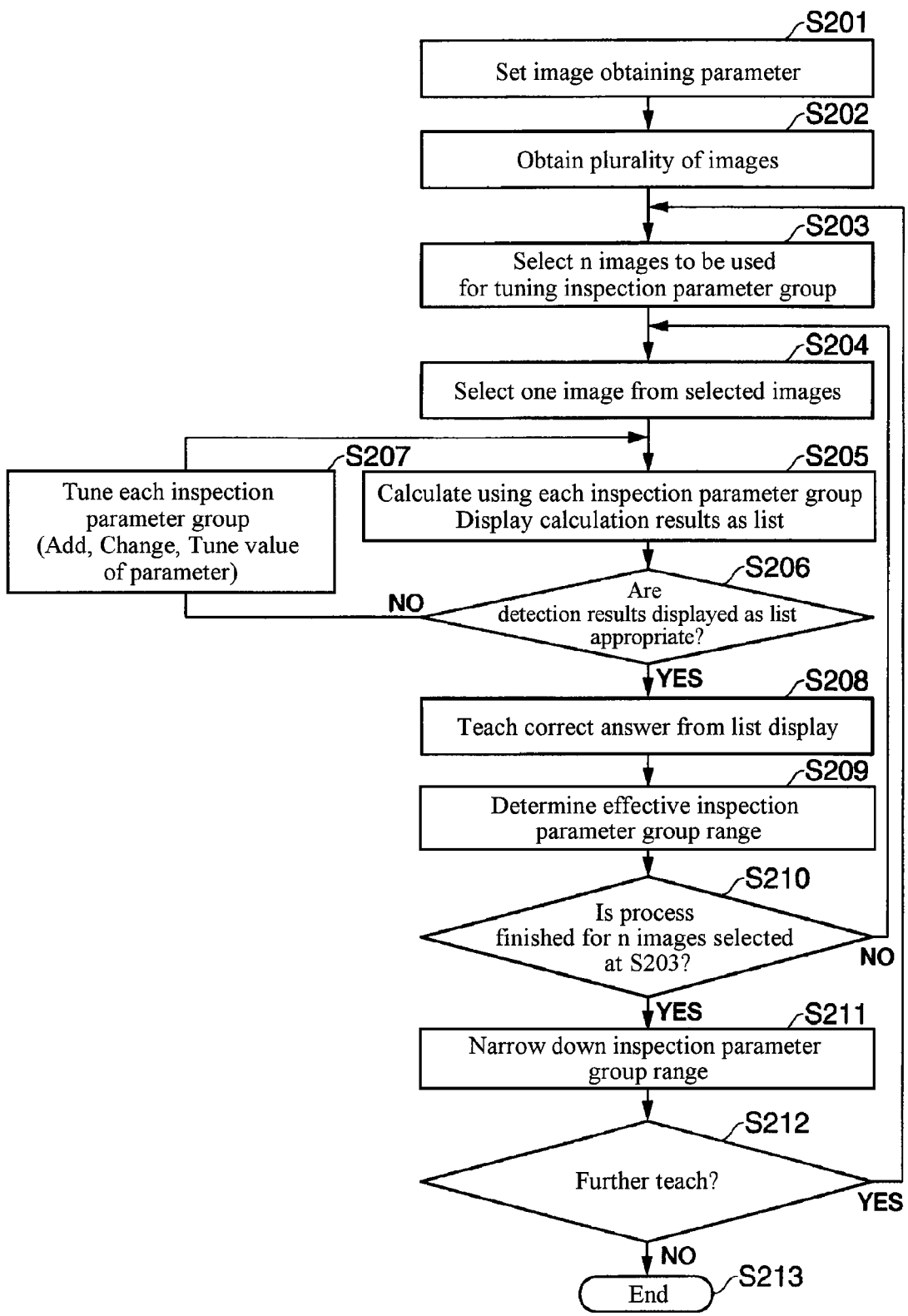
FIG. 2 is a flowchart showing a setting method of an inspection parameter group in a first embodiment of the present invention.

FIG. 2 is a flowchart showing a method of setting a parameter (inspection parameter) group for defect detection of the present invention (first embodiment).

First, the parameter (image obtaining parameter) such as contrast and brightness for obtaining the image is set in order to obtain the image (S201). Next, a plurality of images are obtained by the set image obtaining condition (S202). When obtaining the image, image data at each point is obtained by applying the electron beam 107 to each point on the wafer, which is the specimen 105, by moving irradiation to detect the generated secondary electron 108 or the backscattering electron 109 by the detectors 122 and 123, respectively. Meanwhile, at that time, the inspection parameter group may be set in advance and the defect detection process may be performed by using the parameters. Although it is preferable to use a predetermined standard value as the inspection parameter group herein, a value optionally set by the user may also be used.

Next, n (n is a natural integer) images to be used for tuning the inspection parameter group are selected from the images obtained at the step 202 (S202) (S203). The images are selected by the user by using the input means 120. Although the number of images to be selected herein is optional, the operation becomes complicated if this is too large, so that it is advisable to select an appropriate number. Also, when the defect detection process is already performed by using the predetermined parameter group at a stage of the step S202, it is advisable to select the images to be used for parameter tuning by reference to the result of the defect detection process, for example, five images from the images with defect detection and five images from the images without defect detection, since presence or absence of the defect detection in each image is known. Meanwhile, the controlling process may be configured to automatically select by the controlling means 118.

Figure 3:
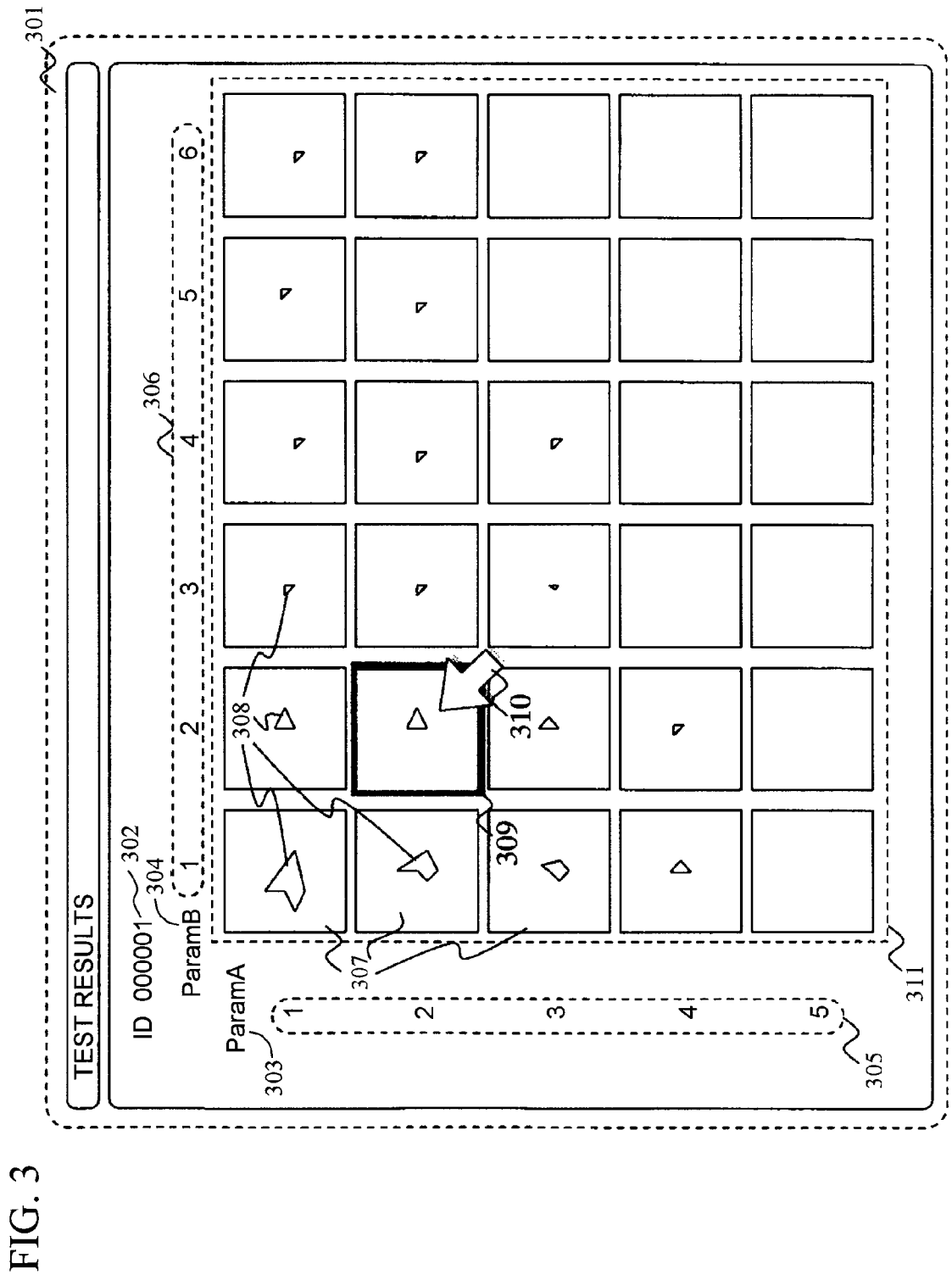
FIG. 3 is a display chart of a GUI showing an example of displaying as a list each defect detection image for the inspection parameter group.

Next, one image is first selected from the images selected at the step S203 (S203) (S204). Herein, when the image is selected, the image processing means 119 performs the calculation process based on the selected image. The calculation process is to detect the defect by executing the comparison operation between the selected image and a reference image (image having the pattern identical to that of the selected image (when a plurality of chips having the identical pattern are formed on the wafer and when the selected image is the image obtained by scanning a predetermined position of one chip, the image obtained by scanning the identical position of a chip adjacent to the chip, for example)), and at that time, the calculation process is performed by using each predetermined inspection parameter group. Then, the calculation results are displayed as a list on the display means 117 (GUI) together with each inspection parameter group (S205). FIG. 3 shows one example thereof. In FIG. 3, five parameters A (305) and six parameters B (306) are set, and the detection results (calculation results) when performing the calculation process by applying a total of 30 types of inspection parameter groups are displayed as a list. Each detection result is displayed as a defect detection image 307 having a defect detection area 308.

Meanwhile, each inspection parameter group applied when performing the calculation process may be a value optionally set by the user. The parameter groups are set in order to determine an effective parameter range (narrow down the effective parameter range) as described hereinafter, so that they are not necessarily set for all of the inspection parameters. In the example shown in FIG. 3, the results of performing the calculation process for the parameter group in which a plurality of values are set for the parameters A and B are displayed. However, when the inspection parameter has also ones other than the parameters A and B, the calculation process is performed by using a predetermined standard value for the parameter other than the parameters A and B.

Herein, if the effective parameter range may not be determined by the calculation results by the parameter groups of the parameters A and B shown in FIG. 3 (when the detection results extracted by the calculation process (defect detection images displayed as a list) are insufficient and the appropriate defect detection image may not be selected when the user teaches a correct answer at a step 208 (S208) to be described later), a parameter other than the parameters A and B is further added, the parameters are changed, or the value of the parameter is tuned, by a method to be described later (S207). That is to say, at a step 206 (S206), it is judged whether the detection results displayed as a list at the step 205 (S205) are appropriate (sufficient) or not. When they are not appropriate, the inspection parameter groups are tuned (S207), then, the procedure returns back to the step S205 to perform the calculation process again using the tuned inspection parameter groups, and the detection results are displayed as a list. The process is repeated until the appropriate (sufficient) detection results are obtained, and when the detection results are appropriate (sufficient), the procedure proceeds to a next step 208 (S208).

Meanwhile, a process flow may be set such that the steps 206 and 207 are provided after performing steps 208 and 209 to be described below. In this case, however, a process at the step 206 is made a step to judge whether the effective inspection parameter group range, which is a result of the step 209, is appropriately determined or not. When the range is not appropriately determined, the tuning of each inspection parameter group described at the step 207 is performed and the procedure returns back to the step 205, and when the range is appropriately determined, the process flow proceeds to a step 210.

Similarly, the process flow may be set such that the steps 206 and 207 are provided after performing a step 211 to be described below. In this case, however, the process at the step 206 is made a step to judge whether the inspection parameter group range, which is narrowed down at the step 211, is appropriate or not. When the range is not appropriate, the tuning of each inspection parameter group described at the step 207 is performed and the procedure returns back to the step 204 to perform again the processes of the steps 204 to 210 for n images using each inspection parameter group herein tuned. When the range is appropriate, the process flow proceeds to a step 212.

Next, the user teaches the correct answer (selects the defect detection image judged to be the optimal defect image) from the images (defect detection images) displayed as a list on the display means 117 (GUI) (S208). Herein, a guide of the correct answer (guide to which defect detection image to select) includes selecting the image, which closely takes the defect, that is to say, the image having the defect detection area 308 with a shape conforming to the defect portion. The correct answer is taught (selected) by the user by indicating the correct image on a GUI screen using the input means 120. When the input means 120 is the mouse, the user may directly click the image, and when the means is the keyboard, the user may uses a cursor key to move a cursor to a target image to select. FIG. 3 shows a state in which a cursor 310 is moved by a mouse 120 to click a detection result 309 in which the parameter A is 2 and the parameter B is 2. At that time, it is advisable that a color of a frame of the detection result 309 changes, for example, such that it is clear that this is clicked. Of course, the means for displaying and the means for selecting are not limited to these methods, and variously modified and improved means and methods may be adopted. For example, although an example of selectively inputting using a pointing device such as the mouse is described above, the configuration such as a touch panel with which the user may selectively inputted by directly touching the GUI screen with finger by integrating the display means 117 and the input means into the GUI is possible.

Figure 4:
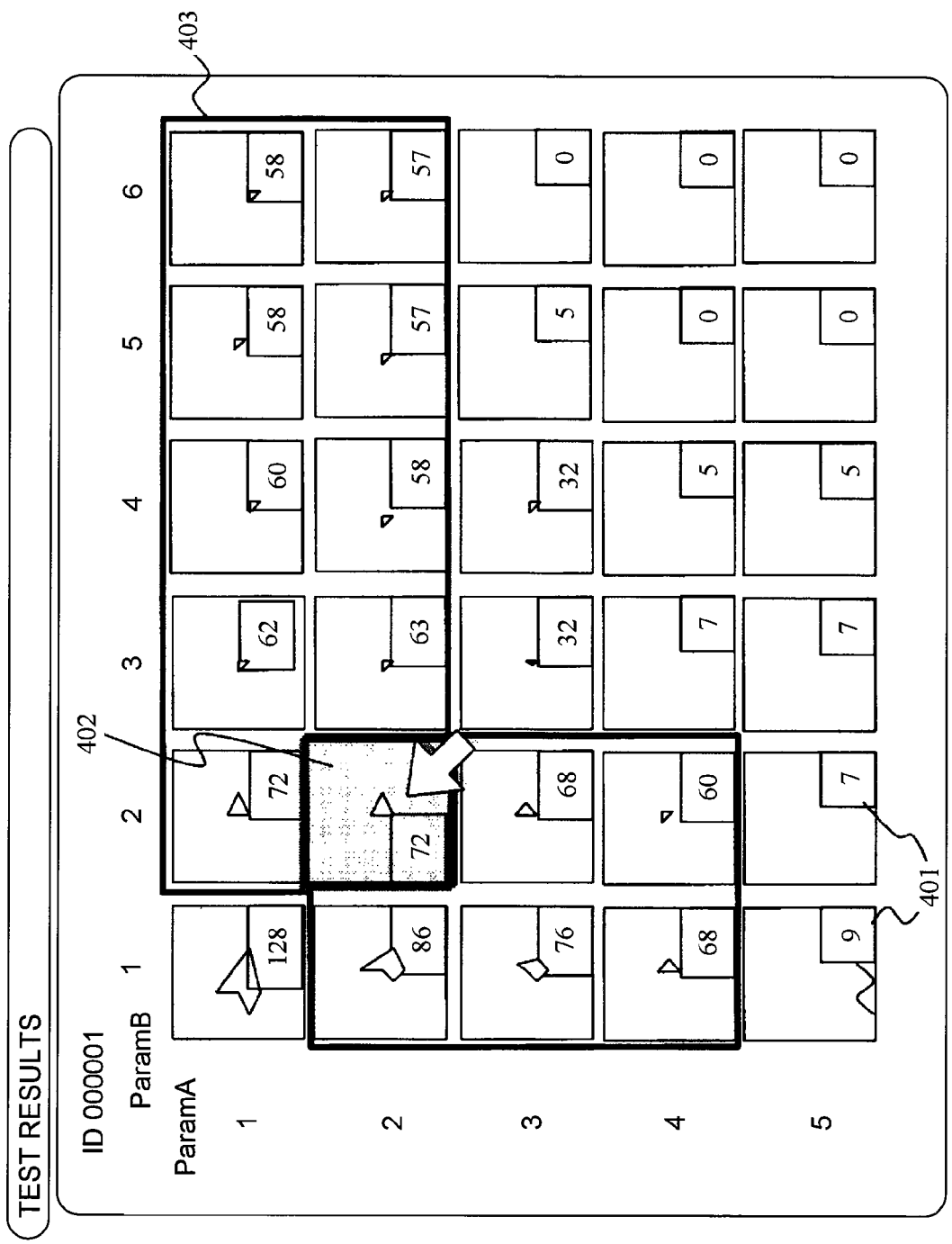
FIG. 4 is a view for illustrating a process to determine an effective inspection parameter group range.

Next, the effective inspection parameter group range (effective defect detection images) is determined based on the defect detection image selected by the user (teaching of the correct answer) (S209). The process is performed by parameter tuning means (not shown) provided in the controlling means 118. Specifically, the defect detection image selected by the user and all of the defect detection images displayed as a list are compared with each other to determine whether the position and the shape of the defect detection area of both images are close to each other or not. When the position and the shape are within predetermined ranges, the range is judged to be effective and the parameter group of the defect detection image is determined to be within the effective inspection parameter group range. Meanwhile, it is determined to be effective or not by determining whether coordinate value of center (gravity), an aspect ratio, an area, a concavo-convex shape of the defect detection area (308 in FIG. 3) of each defect detection image are within predetermined ranges relative to the defect detection area of the defect detection image taught as the correct answer. For example, a condition is set such that displacement of the central position is within α μm radius and within ±10% aspect ratio based on the defect detection area of the defect detection image selected as the correct answer, and the inspection parameter groups of all of the defect detection images having the defect detection area within the range, out of other image displayed as a list (defect detection images), are determined to be within the effective range. Alternatively, the inspection parameter groups of all of the defect detection images having the defect detection area with the area ratio within ±20% based on the defect detection image selected as the correct answer are determined to be within the effective range. FIG. 4 is a view for illustrating the effective range at that time. FIG. 4 shows a case in which the user selects a defect detection image 402 (Param A, Param B)=(2, 2) in the drawing. In the drawing, a numerical value 401 enclosed by a square indicates the area of the defect detection area of each defect detection image. Herein, supposing that the area of the defect detection area of the defect detection image 402 taught as the correct answer is 72, the effective range includes the defect detection images (403 in the drawing) having the defect detection area with the area ratio 0.8 to 1.2 (±20%). Meanwhile, the condition to determine the effective inspection parameter group range may be set by the user from the input means 120, or may be registered in advance. It is also possible to configure such that the GUI in which the condition is graphically displayed is provided to allow the user to input from the GUI.

The processes from the step 204 (S204) to step 209 (S209) are performed for all of the n images selected at the step 203 (S203). That is to say, when a determination process of the effective inspection parameter group range (S209) is not finished for all of the n images selected at the step 203, the procedure returns back to the step S204 to select again one of the images not yet processed from the selected n images (S204), and further repeats the processes from the step 205 to the step 209. The process is repeated until the process is finished for all of the selected n images, and when the process for all of the n images is finished, the procedure proceeds to a next step (S211) (S210). Meanwhile, a case in which only one defect is included in one image is described in the description. However, when two or more defects are included in one image, the processes from the step 204 to the step 209 are repeated for each defect to determine the effective inspection parameter group range for each defect. In this case, it is necessary that not only select one image but also further select one defect in the image at the step 204.

Figure 5:
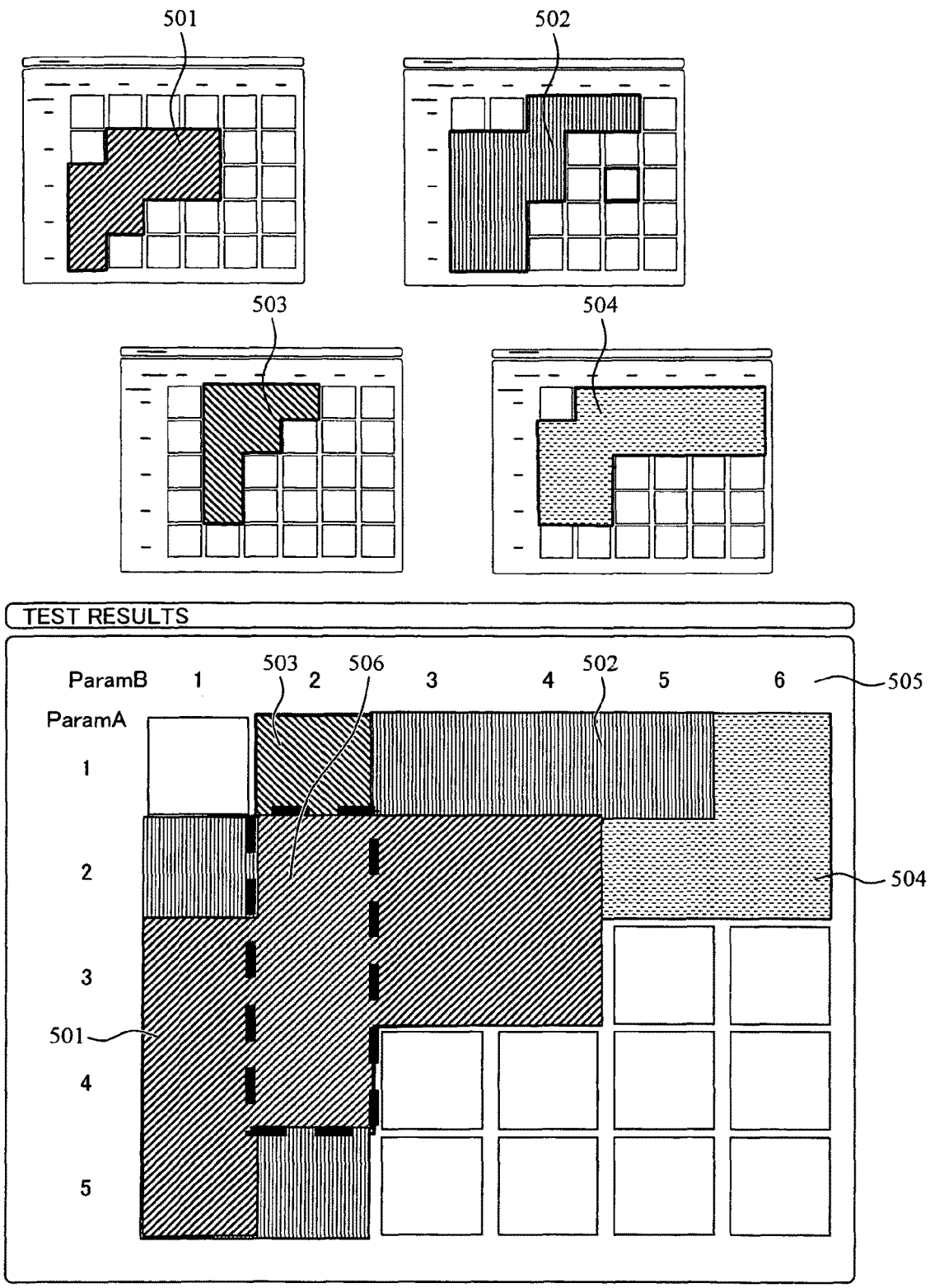
FIG. 5 is a view for illustrating a process to narrow down an effective inspection parameter group range.

Next, the effective inspection parameter group range is narrowed down based on the effective inspection parameter group range (effective defect detection images) determined for each of the n images (S211). Herein, the effective inspection parameter group ranges determined for each of the images (n images) are overlaid with one another and an overlaid range is judged (narrowed down) as the effective inspection parameter group range. FIG. 5 is a view for illustrating the process of this narrowing down. Herein, a case in which the number of n images selected at the step 203 is four is shown. Ranges 501 to 504 in the drawing indicate the effective inspection parameter group range of each of images obtained by performing the processes from the step 204 to the step 209 for the four images. At the step 211, the images are overlaid with one another (a screen 505 in the drawing is obtained by overlaying the ranges 501, 502, 503 and 504 in this order top to bottom) and an overlaid range 506 is judged (narrowed down) to be the effective inspection parameter group range. Meanwhile, the narrowing down process of the inspection parameter groups is the process performed by the parameter tuning means (not shown) provided in the controlling means 118 (process performed in the tool). It is not necessary that the screen display in FIGS. 4 and 5 should be displayed on the display means 117 (GUI).

The effective inspection parameter group range may be set (narrowed down) for all of the images (defects) by the process. However, there is a case in which the effective parameter range is not defined, or this is not defined as one common range, due to difference in characteristic of the semiconductor pattern, which is the specimen 105. In this case, it is advisable that the range on which the effective inspection parameter group ranges of the image are overlaid the most is narrowed down as the effective parameter range. In addition, when the effective inspection parameter group range is divided into a plurality of ranges, it is advisable that the parameter groups in each range is set and held as the effective (tuned) inspection parameter groups. Meanwhile, when the overlaid range is too small, it is possible to configure to tune each inspection parameter group as in the case of the step 207, perform the processes from the step 204 to the step 211 again using each tuned inspection parameter group, and perform again the narrowing down process (S211) of the inspection parameter group range.

Next, it is judged whether further teaching is necessary or not for another image (S212). When teaching is necessary, the procedure returns back to the step 203 to repeat the processes from the step 203 to step 211. When it is judged that the range is not sufficiently narrowed down by the range of the inspection parameter groups narrowed down at the step 211, it is advisable that the teaching is performed again at the step 212. On the other hand, when it is not necessary to teach, the process ends (S213).

The inspection parameter groups tuned (narrowed down) by the processes (the processes from the step 201 to the step 213) are recorded and held in a recipe file. In the recipe file, the operation condition when inspecting the specimen 105 is described as electronic data. When inspecting the wafer, which is the specimen 105, the recipe file is used, and the defect detection process and the image obtaining process are performed based on the condition and parameter recorded in the recipe file. Meanwhile, as described above, when there is a plurality of effective inspection parameter groups such as when the effective inspection parameter group range is divided into a plurality of ranges, it is advisable to select and use the parameter group when inspecting.

Figure 6:
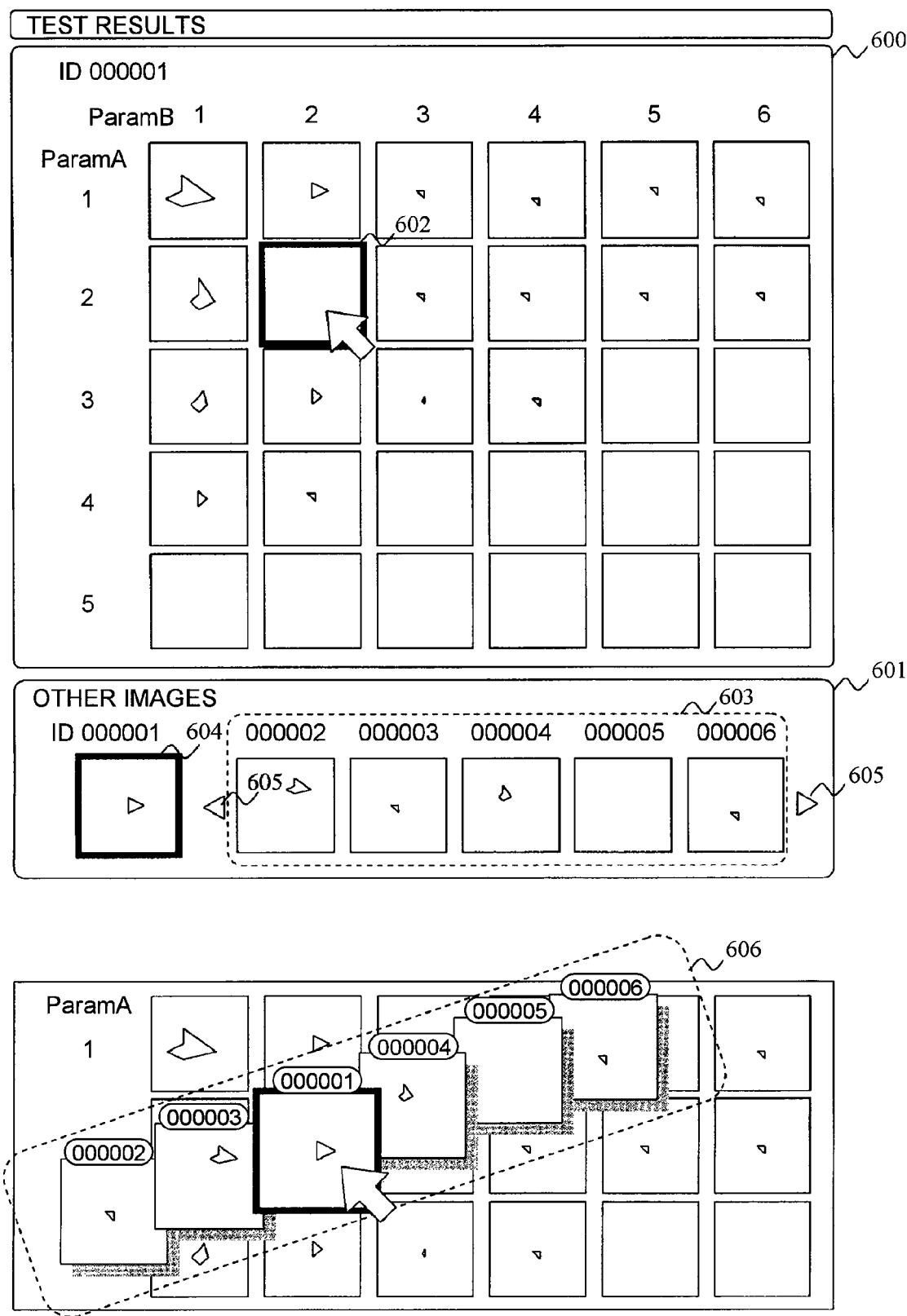
FIG. 6 is a display chart of the GUI showing an example to add a screen to display an inspection result of another image together with a list display of each defect detection image for the inspection parameter group.

FIG. 6 is a view showing one example of a list display screen of the calculation results displayed on the display means 117 (GUI) at any stage of the steps 205 to 212. As shown in FIG. 6, in this configuration, a list screen 601 of the defect detection images taught (selected) by the user as the correct answers for each image (each image having identification numbers of ID 000001 to 000006 in the drawing) at the step 208 by the process is displayed in real time together with a list display screen 600 of the calculation results of an image now processing (image having the identification number of ID000001). Thereby, the user may simultaneously check the results of the images (images having the identification numbers of ID000002 to 000006) in addition to the image now processing (image having the identification number of ID000001). Herein, it is advisable to provide a function to allow the list display screen 600 to operate with the screen 601. For example, when the user selects the defect detection image 602 in the list display screen 600, the detection results of a case in which the inspection parameter group corresponding to the selected defect detection image 602 (the parameter A is 2 and the parameter B is 2 in FIG. 6) is applied to another image (each defect detection image taught as the correct answer at the step 208 for each image having the ID 000002 to ID 000006 in FIG. 6) may be displayed in a frame 603. The displayed contents in the frame 603 change in real time according to the position of the defect detection image 602 selected by the user and may be checked for the defect detection image of another image by a right-left scroll key 605. Also, it is possible to register specific defect ID.

Meanwhile, an image 604 in FIG. 6 is the same as the image 602. Also, it is not necessary to always display the screen 601, and this may be configured to be displayed only when necessary at any stage from the step 205 to the step 212. Further, it is possible to configure such that when the user selects (for example, double clicks) the defect detection image 602 in the list display screen 600 as shown in 606 in FIG. 6, the detection results of other images displayed in the frame 603 are displayed in a spreading manner around the selected 602 as the center as shown in 606. Of course, the display means is not limited to the example, and variously modified and improved display means may be applied.

Figure 7:
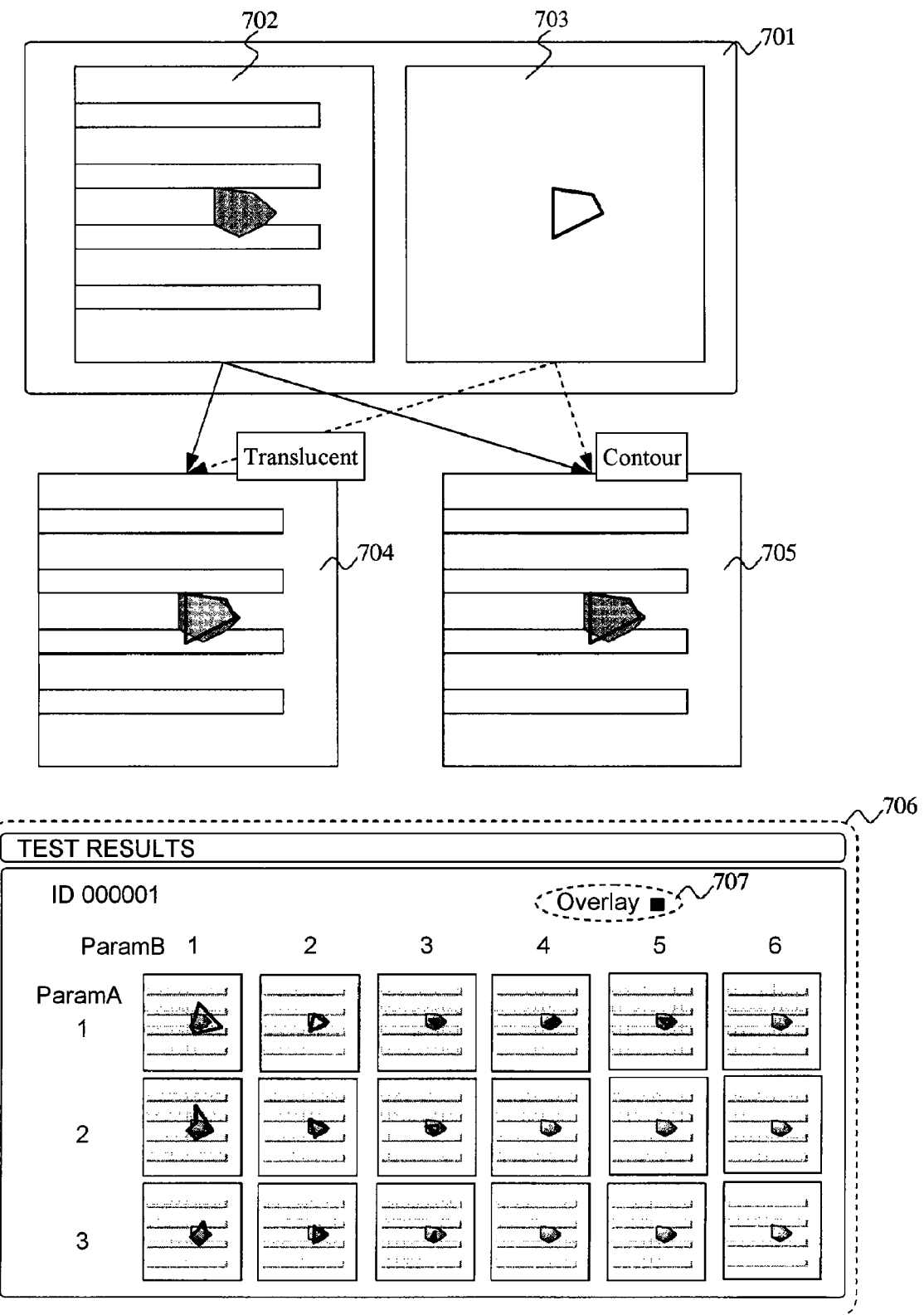
FIG. 7 is a view for illustrating an overlay of a defect image with a defect detection image.

FIG. 7 is a view for illustrating an example of displaying both of the defect image (images by secondary electron and images by backscattered electron detected by the secondary electron detector 122 and the backscattered electron detector 123 and displayed on the display means 117 through the controlling means 118 or the like) and the detection result (defect detection images calculated by the image processing means 119 and displayed as a list on the display means 117 through the controlling means 118) on the display image 117 (GUI). It is preferable to display the defect image and the detection result so as to be compared to each other in this manner, because this helps the user to teach the correct answer at the step 208. As a display mode of the defect image and the detection result, as shown in 701 in FIG. 7, it is preferable that a defect image 702 and a detection result 703 are separately displayed or that the detection result (defect detection area) is translucently displayed and displayed so as to be overlaid with the defect image as in 704. Especially, in the latter case, the positional relationship of both may be easily comprehended and this is effective when the user teaches the correct answer. Meanwhile, the overlay is not limited to translucent, and it is possible that only a contour of the defect detection area is extracted and overlaid, for example (705). Also, all of the detection results (defect detection images) may be displayed so as to be overlaid (706). In addition, it is possible to set whether overlaying is performed or not by ON or OFF of a button 707. Further, as shown in FIG. 8, it is possible that only an image 801 on which the cursor is overlaid (or selected by the cursor) is displayed so as to be overlaid as described above in accordance with the motion of the cursor (arrow in the drawing). Further, it is also possible that all of the detection results are displayed so as to be overlaid and only the detection result of only the image on which the cursor is overlaid is displayed. The display method may take various modes as necessary.

Figure 9:
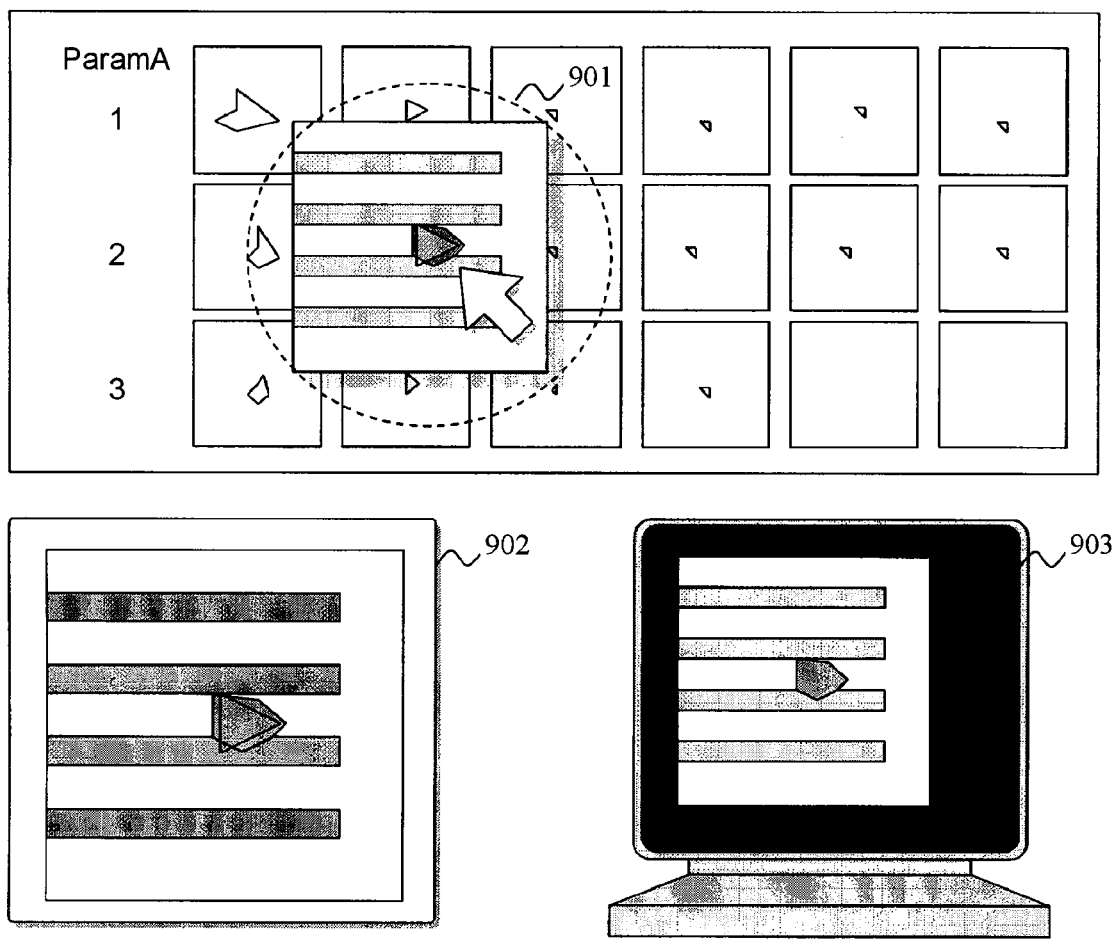
FIG. 9 is a display chart of the GUI showing an example to overlay display a portion of the image displayed as a list in an enlarged manner.

Also, when displaying a list, since a lot of images are displayed at once without being overlaid, individual image becomes smaller and the visibility thereof becomes wrong. Therefore, as shown in FIG. 9, it may be configured such that when the cursor is put on one of the images of the detection results, the overlaid display of the image is displayed in an enlarged manner (901), displayed on another window 902, or displayed on another screen 903.

Figure 10:
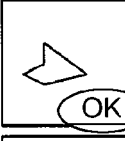
FIG. 10 is a display chart of the GUI showing an example of representing character or the like on the image displayed as a list to distinguish presence or absence of detection.

Further, for the same reason that the visibility becomes wrong when displaying the list, when the presence or absence of the detection is separately displayed by simple representation, the presence and absence of the detection is easily checked without directly looking at the image. FIG. 10 shows an example to attach a character "OK" 1001 to the detected image on the list of the detection results to easily distinguish the same from the image, which is not detected. The portion "OK" 1001 may be a figure or a picture other than the character. Also, as indicated by 1002 and 1003 in the drawing, the portion may be displayed using another visual means such as by changing the color of the frame.

Figure 11:
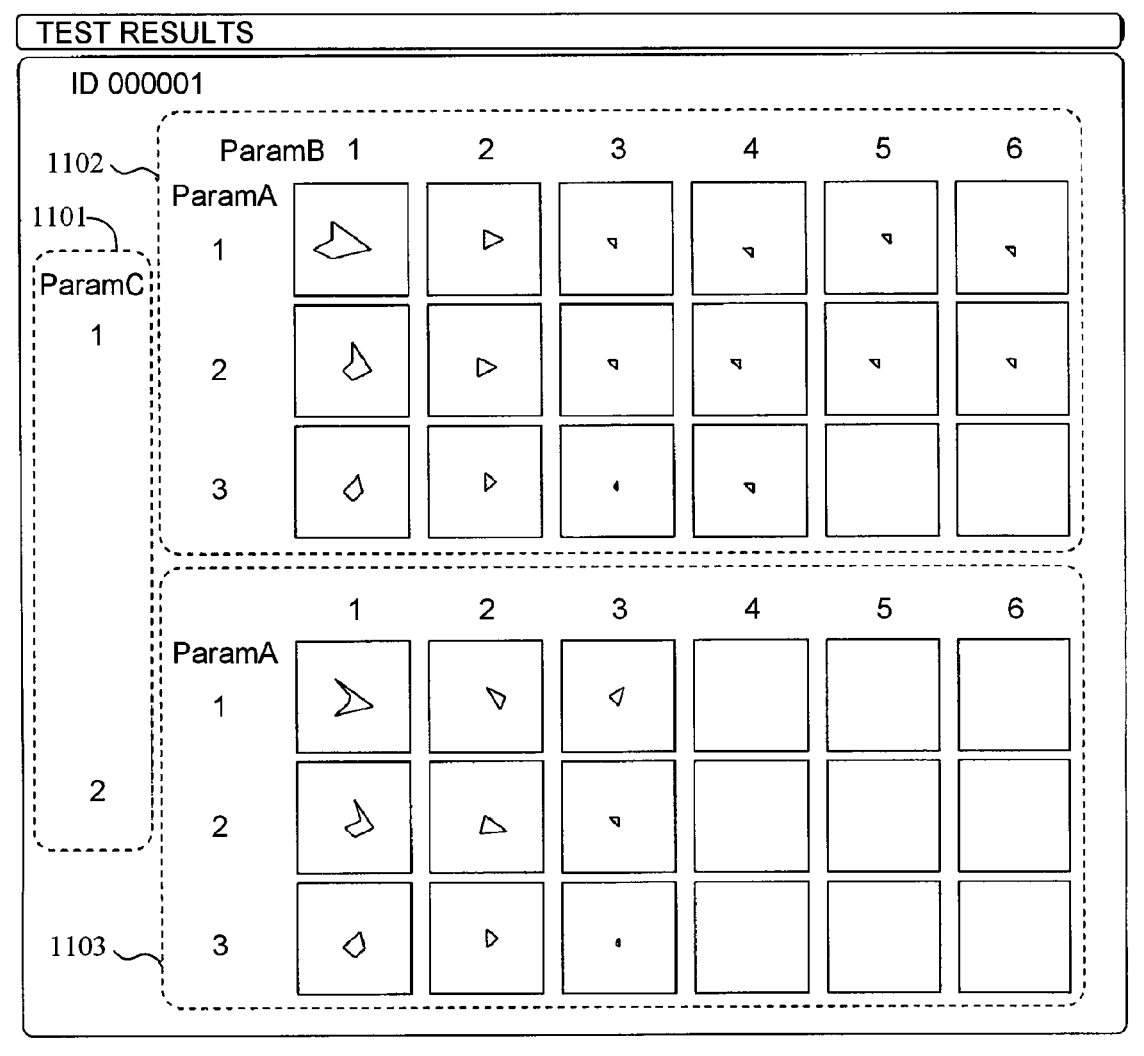

Next, as already described, a countermeasure against a case in which the defect detection areas (defect detection images) displayed as a list at the step 205 are not sufficiently extracted is herein described. The countermeasure against this case includes to add the inspection parameter as necessary and to perform the calculation process (S205) with each defect detection parameter group including this parameter. The display means 117 (GUI) at that time may display the list display of the detection results with a plurality of columns and lines. Thereby, three or more parameters may be displayed in one screen. FIG. 11 shows a screen display example in which list displays 1102 and 1103 of the parameter A (ParamA) and the parameter B (ParamB) are provided in two columns and a parameter C (ParamC) 1101 is further longitudinally provided. Thereby, the calculation result obtained by performing the calculation process (S205) using each inspection parameter group composed of three inspection parameters may be displayed.

Figure 12:
FIG. 12 is a view for illustrating means of changing the inspection parameter to display.

Also, another countermeasure includes changing the inspection parameter as needed (change to another inspection parameter). FIG. 12 shows an example of displaying by changing an element of an axis. The drawing shows that the parameter B may be changed with a parameter E (1202) by dragging an icon 1201 displayed as the parameter E (ParamE) to the icon of the parameter B (ParamB). Thereby, the calculation results (detection results) when performing the calculation process using another inspection parameter group may be checked Meanwhile, as described above, when not all of the inspection parameters are displayed in the drawing, it is advisable to configure to perform the calculation process using a predetermined value for a parameter other than the displayed inspection parameters and to check them in another window.

Figure 13:
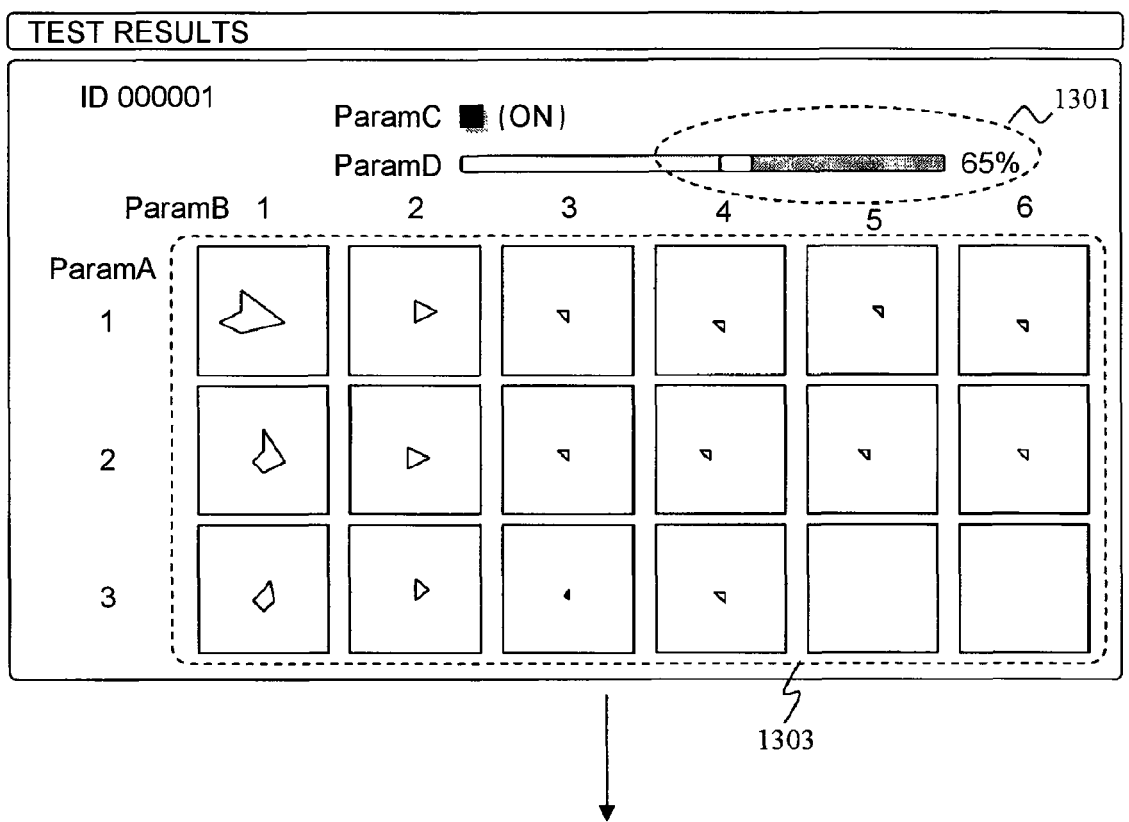
FIG. 13 is a display chart of the GUI showing an example of displaying one of the inspection parameters by a slide bar.
Figure 13:
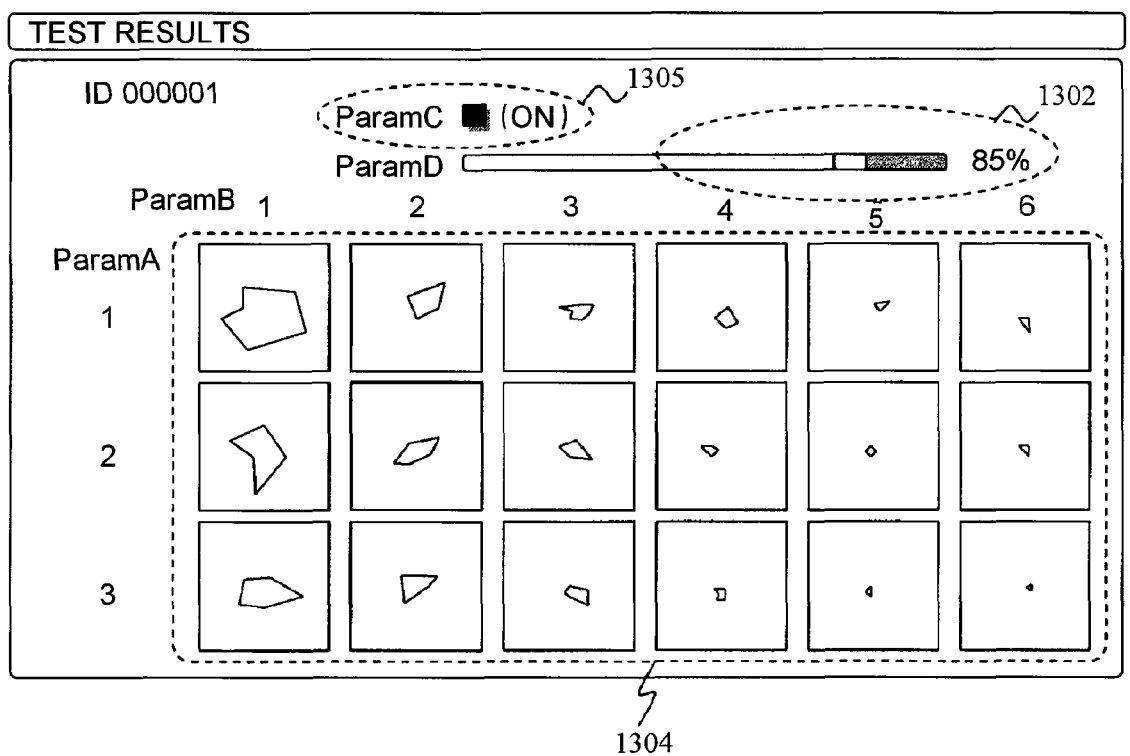

Also, as the display means for the inspection parameters, it is possible to display with a mode other than the list as described above. FIG. 13 shows an example of displaying one of the inspection parameters using a slide bar. As shown in this drawing, when the slide bar of a parameter D (ParamD) is changed from 1301 to 1302, the detection result 1303 accordingly changes in real time to a detection result 1304.

Also, in a case of a parameter capable of taking only a binary value of ON and OFF as the parameter C (ParamC) in FIG. 13, it is possible to configure so as to simply set by arranging a button such as 1305 in the drawing.

Figure 14:
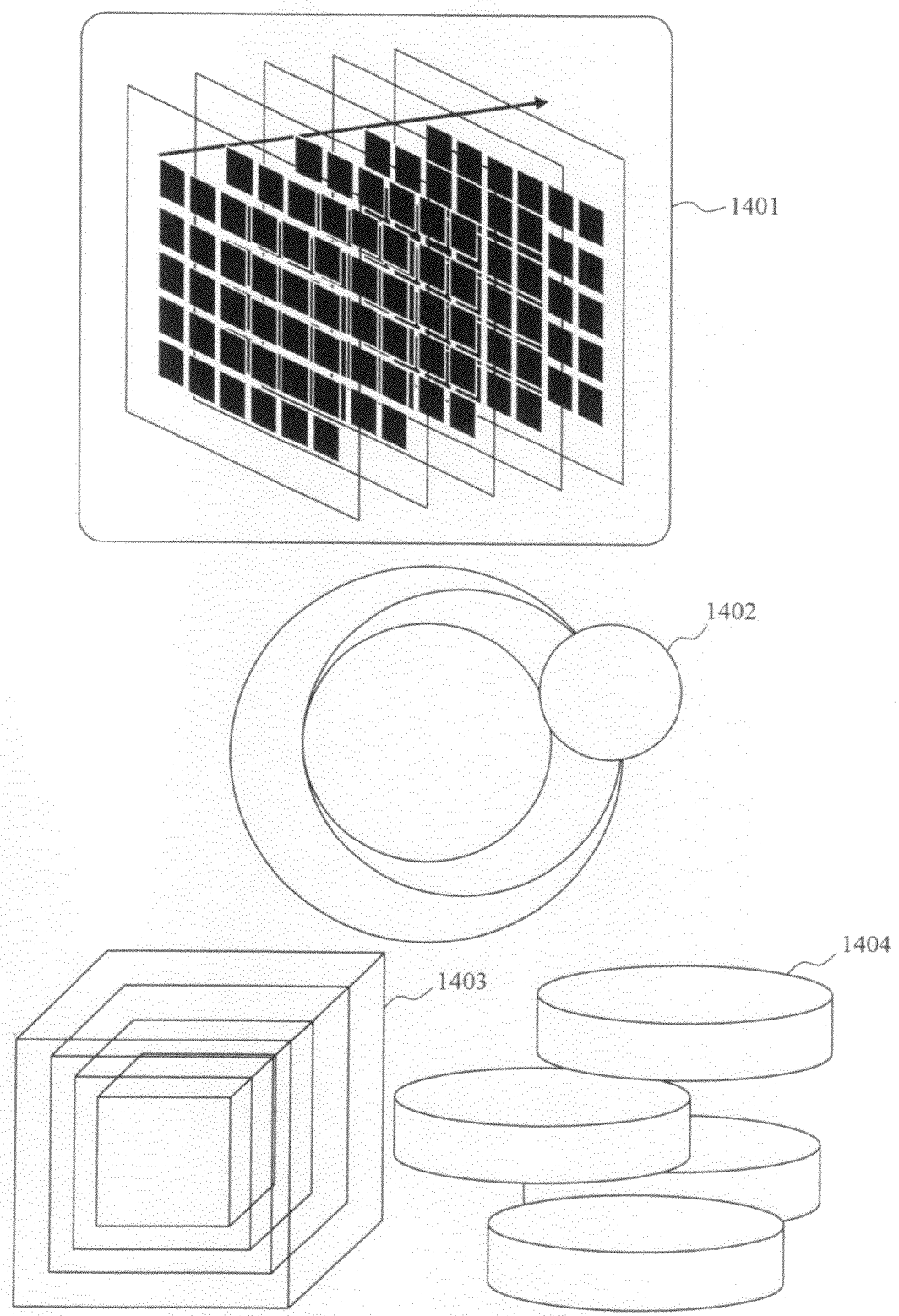
FIG. 14 is a view for illustrating various display means such as a stereoscopic display.

Further, as another display method, various display means not limited to a plane display may be considered such as a stereoscopic display as shown in 1401 in FIG. 14 to three-dimensionally display by arranging a plurality of images, or the display on a surface of a sphere or a multilayer shell-like arrangement as shown in 1402, 1403 and 1404. However, as property of a human, the arrangement more than two-dimension is significantly bad as a list and operation thereof becomes difficult. Therefore, the display method of two-dimension or less is desirable.

Meanwhile, although the example of displaying name and value of the inspection parameter group are displayed is shown in the display method, it is possible that the name and value of the inspection parameter are not displayed as shown in FIG. 13. This is because a complicated inspection parameter group may be easily set by performing the simple input process as described at the step 201 (S201) to the step 213 (S213) in FIG. 2 in the present invention even when the detailed contents of each inspection parameter are not known.

Figure 16:
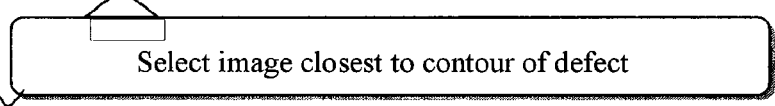
FIG. 16 is a display chart of the GUI showing an example of adding a function to display a comment by a window and a chart.
Figure 16:
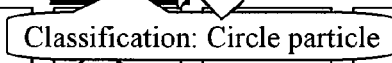

In addition, when actually performing a setting operation of the inspection parameter group, the users have various learning levels. One user may advance without description, but another user may operate while checking the operation one by one. If the user should turn the pages of a manual or to check the procedure for each operation, the operation efficiency is lowered, so that it is useful to display the window and the chart to show what to do now and what to do next as necessary. FIG. 16 shows an example of displaying such window and chart. The user may advance the operation efficiently by referring to a comment 1601 in the drawing.

Also, at the step 208 (S208 in FIG. 2), as an aid for the user to teach the correct answer, it is possible to configure to display (FIG. 14, 1602) a classification result of an automatic defect image classification function (ADC) for each detection result, for example. Thereby, it is possible to give the user a determination criterion whether the detection result is correctly detected or not.

Meanwhile, the window and chart 1601 and the display 1602 of the classification result may be always displayed, or it is possible to provide a display/non-display button on the screen to select display/non-display by clicking the same.

Figure 17:
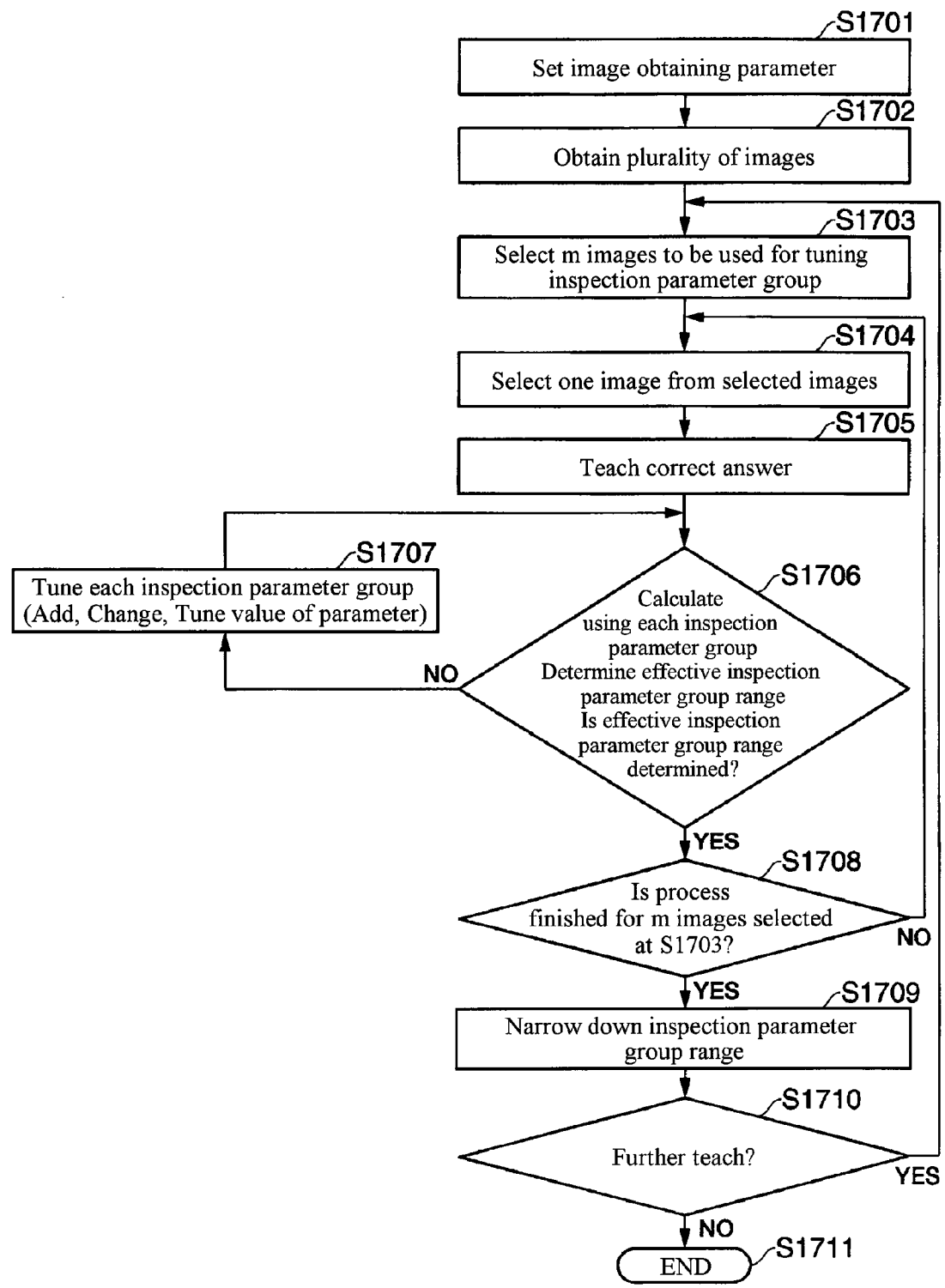
FIG. 17 is a flowchart showing a setting method of the inspection parameter group in a second embodiment of the present invention.

Next, a setting method of the inspection parameter group of another embodiment (second embodiment) of the present invention is described. FIG. 17 is a flowchart showing a setting method of the inspection parameter group in the second embodiment of the present invention. The second embodiment is different from the first embodiment in that the user does not teach the correct answer from the list display (step 208 in FIG. 2), but manually specifies the correct portion.

First, as in the case of the step 201 (S201), the image obtaining parameter for obtaining the image is set (S1701). Next, as in the case of the step 202 (S202), a plurality of images are obtained by the set image obtaining condition (S1702). Next, m (m is a natural number) images to be used to tune the inspection parameter group are selected from obtained images (S1703). The images may be selected as in the case of the step 203 (S203).

Figure 18:
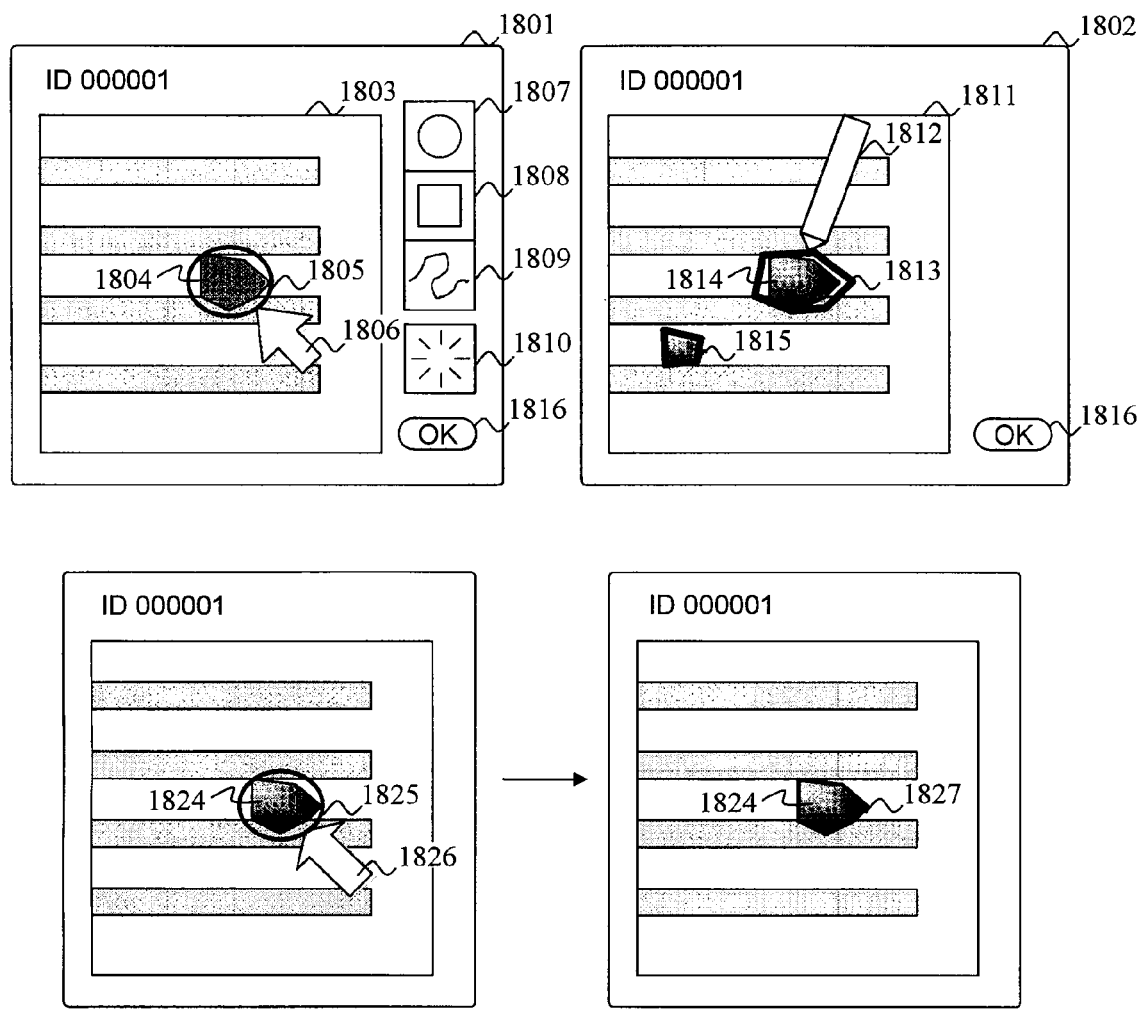
FIG. 18 is a view for illustrating a method of teaching position and shape of the defect (teaching a correct answer).

Next, one image is first selected from the selected m images (S1704), and the correct answer, that is to say, the defect area (place and shape of the defect) is taught from the image (S1705). FIG. 18 is a view for illustrating the teaching method, and display screens 1801 and 1802 show the GUI used for teaching the correct answer. Also, 1804 of an image 1803 indicates the defect of note. The correct answer is taught by enclosing the defect portion by the frame. For example, this is performed by providing means for drawing a circle and a square on the GUI to draw a figure so as to enclose the defect portion 1804. In the display screen (GUI) 1801, an example of teaching by a circle 1805 is shown. In this case, it is advisable that the circle 1805 is dragged by a cursor 1806 to near the defect, a size and shape of the circle 1805 are modified, and the circle 1805 is drawn so as to faithfully catch the defect portion as far as possible. The figure to enclose the defect is not limited to the circle and another figure such as a square, a hexagon, a concave polygon and a convex polygon may be used as far as this is a closed figure. FIG. 18 shows an example of providing icons (1807 to 1809) to change the figure to be drawn by clicking. Herein, the figure to be drawn may be changed by clicking the icon of the desired figure. In the example shown in the drawing, the icon 1807 shows the circle, the icon 1808 shows the square, and the icon 1809 shows a free hand. As the input means when drawing, a pen input method or the like may be used in addition to the mouse and a track ball. Also, various other input means may be used. The display screen (GUI) 1802 indicates an example when inputting by free hand. In this case, the defect area of a defect portion 1814 in the image 1811 is directly drawn on the screen by input means 1812 (1813). Herein, as the input means 1812, the input means such as a touch panel and a tablet for inputting by directly putting an exclusive pen on the GUI screen may be used.

Other than that, it is possible to configure to extract (automatically extract by a program of the controlling means 118) a defect portion 1824 by the image processing, by specifying the defect portion 1824 to be taught (1825, 1826), thereby selecting a more correct defect area 1827.

Meanwhile, as indicated in the display screen 1802, when there are a plurality of defect portions on the screen 1811, a plurality of areas (1813, 1815) may be selected by drawing. After specifying (drawing) the area, 1816 is clicked to finish teaching the correct answer for the image.

Next, based on the teaching of the correct answer (specification of the place and shape of the defect portion), the effective inspection parameter group range is determined as in the case of the step 209 (S209) (S1706). That is to say, the effective parameter range (effective defect detection images) is determined by comparing each defect detection area of the images displayed as a list (each defect detection image) obtained by performing the calculation process to each predetermined inspection parameter group with the above-taught position and shape of the defect portion. Herein, when the effective inspection parameter group range may not be determined, each inspection parameter group is tuned (the inspection parameter is added and changed and the value is tuned) as in the case described at the step 207 (S207) (S1707), and the calculation process by the image processing means 119 at the step 1706 is performed again for the tuned parameter groups. Then, the effective inspection parameter group range is again determined for the detection results, which are the calculation results. The process is repeated until the effective inspection parameter group range is determined. Meanwhile, in the second embodiment, the user does not teach the correct answer from the list display of the calculation results as in the first embodiment and therefore, it is not necessarily required to display the list of the calculation results on the display means 117 (GUI).

The processes from the step 1704 (S1704) to step 1707 (S1707) are performed for all of the m images selected at the step 1703. Then, it is judged whether the process is finished form images or not (S1708). When there is an unprocessed image, the procedure returns back to the step 1704 (S1704) to select one of the unprocessed images (S1704) and repeats the processes from the step 1704 to the step 1707. The process is repeated until the process is finished for all of the m images and when this is finished, the procedure proceeds to a next step 1709.

Next, the inspection parameter group range is narrowed down based on the effective inspection parameter group range determined for each of m images (S1709). This narrowing down may be performed as in the case of the step 211 (S211). Next, it is judged whether further teaching using another image is necessary or not. When further teaching is necessary, the procedure returns back to the step 1703 to repeat the processes from the step 1703 to the step 1709 again. When teaching is not necessary, the procedure ends (S1711).

The inspection parameter groups tuned (narrowed down) by the process are recorded and held in the recipe file as in the case of the first embodiment. The recipe file may be used when inspecting another wafer or the like.

Meanwhile, the narrowing down of the effective inspection parameter group range at the step 1709 may be performed in real time when the teaching of the correct answer of each image is finished without waiting for the teaching of the correct answer for all of the selected images (m images selected at the step 1703) (the same is true in the first embodiment). In this manner, it is possible to finish halfway when the result is excellent, so that it is possible to finish tuning the inspection parameter groups at an earlier step. Also, a representation technique shown in FIGS. 6 to 10 may be similarly applied to this embodiment. For example, it may be configured to check the detection result of another image in real time while advancing the teaching of the correct answer. It may be configured to check the result by overlaying the defect image with the translucent image or a contour extracting image of the detection image, or to overlay display only the portion of the result on which the cursor is put (or other way around). It may be configured to display in an enlarged manner as needed, or to attach a mark excellent in visibility to the detected image. These techniques are effective in helping the visual comprehension to make the operation easier.

Although the embodiments of the present invention are described as above, the present invention is not limited to the defect inspection tool using the electron beam, and is applicable to the inspection tool using a light source such as light and an ion beam. Also, this is not limited to the parameter tuning of the defect detection, and this may be applied to another parameter tuning by separately providing a criterion of appropriate correct answer, such as length measurement and image classification. In addition, this may be used as a part of the processing operation of the saved image not only when actually inspecting the wafer. Further, the inspection tool of the present invention may be applied to various tools, for example, a microscope not using the electron beam as a probe, such as a review SEM, an inspection SEM, a length measuring SEM, a general-purpose SEM, a TEM, another optical microscope, an STM, and an AFM.

Meanwhile, the present invention is summarized as follows.

1. A defect inspection tool, comprising:
    an image obtaining unit for obtaining an image by applying an electron beam to a specimen;
    an image processing unit for performing a calculation process by using each predetermined inspection parameter group based on the image obtained by the image obtaining unit; and
    a parameter tuning unit for performing a process to determine an effective inspection parameter group from calculation results by the calculation process and narrowing down an inspection parameter group range by repeating the process for a plurality of images obtained by the image obtaining unit, wherein
    a defect of the image obtained by the image obtaining unit is detected by using the inspection parameter group narrowed down by the parameter tuning unit.

2. A defect inspection tool, comprising:
    an image obtaining unit for obtaining an image by applying an electron beam to a specimen;
    an image processing unit for performing a calculation process by using each predetermined inspection parameter group based on the image obtained by the image obtaining unit to detect each defect detection image for each inspection parameter group;
    a display unit for displaying a list of each defect detection image detected by the image processing unit;
    an input unit for selectively inputting a defect detection image from each defect detection image displayed as a list on the display unit; and
    a parameter tuning unit for performing a process to determine an effective inspection parameter group range from each defect detection image detected by the image processing unit based on the defect detection image selectively inputted by the input unit and narrowing down the inspection parameter group by repeating the process for a plurality of images obtained by the image obtaining unit, wherein
    a defect of the image obtained by the image obtaining unit is detected by using the inspection parameter group narrowed down by the parameter tuning unit.

3. The defect inspection tool according to the item 2, wherein a determination process of the effective inspection parameter group range by the parameter tuning unit is a process to judge whether an area, a central coordinate, an aspect ratio and/or a concavo-convex shape of a defect detection area of each defect detection image displayed as a list are within predetermined ranges or not, based on the area, the central coordinate, the aspect ratio and/or the concavo-convex shape of the defect detection area of the defect detection image selectively inputted by the input unit, and to determine the inspection parameter group for the defect detection image having the defect detection area within the predetermined range to be within the effective range.

4. A defect inspection tool, comprising:
    an image obtaining unit for obtaining an image by applying an electron beam to a specimen;
    an image processing unit for performing a calculation process using each predetermined inspection parameter group based on the image obtained by the image obtaining unit to detect calculation results for each inspection parameter group;
    an input unit for teaching a defect area included in the image based on the image obtained by the image obtaining unit; and
    a parameter tuning unit for performing a process to determine an effective inspection parameter group range from the calculation results detected by the image processing unit based on the defect area taught by the input unit and narrowing down the inspection parameter group range by repeating the process for a plurality of images obtained by the image obtaining unit, wherein
    a defect of the image obtained by the image obtaining unit is detected by using the inspection parameter group narrowed down by the parameter tuning unit.

5. The defect inspection tool according to the item 4, wherein a determining process of the effective inspection parameter group range by the parameter tuning unit is a process to judge whether an area, a central coordinate, an aspect ratio and/or a concavo-convex shape of a defect detection area of the calculation results for each inspection parameter group detected by the calculation process by the image processing unit are within predetermined ranges based on the area, the central coordinate, the aspect ratio and/or the concavo-convex shape of the defect area taught by the input unit, and to determine an inspection parameter group for the calculation result having the defect detection area within the predetermined range to be within the effective range.

6. The defect inspection tool according to the item 4 or 5, having a GUI for displaying the image obtained by the image obtaining unit, wherein
    the defect area is taught by the input unit by enclosing a defect portion included in the image displayed on the GUI by a figure drawn by the input unit, by drawing the defect area of the defect portion included in the image by the input unit, or by extracting the defect area of the defect portion included in the image by image processing.

7. The defect inspection tool according to any one of the items 1 to 6, wherein narrowing down of the inspection parameter groups by the parameter tuning unit is performed by overlaying the effective inspection parameter group ranges determined by the process for a plurality of images obtained by the image obtaining unit, respectively, and narrowing down the inspection parameter group range to a range on which the ranges are overlaid the most.

8. The defect inspection tool according to any one of the items 1 to 7, having a function for changing an inspection parameter, adding the inspection parameter, or tuning a value of the inspection parameter, of each inspection parameter group used when performing the calculation process in the image processing unit.

9. The defect inspection tool according to any one of the items 1 to 8, having a display unit for displaying a list of the calculation results obtained by the calculation process by the image processing unit, wherein the display unit is the GUI.

10. The defect inspection tool according to the item 2 or 3, wherein the display unit for displaying a list of each defect detection image being the calculation results obtained by the calculation process by the image processing unit is a GUI, and the defect detection image is selectively inputted by the input unit by using the GUI.

11. The defect inspection tool according to the item 9 or 10, wherein the GUI has a function for displaying or not displaying information regarding the inspection parameter group.

12. The defect inspection tool according to any one of the items 9 to 11, having a function for displaying specified or selected calculation result in an enlarged manner by specifying or selecting the calculation results displayed as a list on the GUI.

13. The defect inspection tool according to any one of the items 9 to 12, wherein the GUI has a function for synthesizing the image obtained by the image obtaining unit with the defect detection image being the calculation results obtained by performing the calculation process by the image processing unit based on the image to display.

14. The defect inspection tool according to the item 13, wherein the GUI has a function for selecting presence or absence of the synthesis.

15. The defect inspection tool according to any one of the items 9 to 14, wherein the GUI has a function for displaying a list of the calculation results obtained by performing the calculation process by the image processing unit based on the image obtained by the image obtaining unit and for simultaneously displaying the calculation result obtained by performing the calculation process by the image processing unit based on an image different from the image obtained by the image obtaining unit, and
by selecting one of the calculation results displayed as a list using the GUI, the calculation result based on the simultaneously displayed different image is calculated by the image processing unit based on the different image by using the inspection parameter group corresponding to the selected calculation result and is changed with the calculation result obtained by the calculation process.

16. The defect inspection tool according to any one of the items 9 to 14, wherein the GUI for displaying a list of the calculation results obtained by the calculation process by the image processing unit based on the image obtained by the image obtaining unit has a function in which by selecting one calculation result from the list display by using the GUI, the calculation process is performed by the image processing unit for an image different from the image by using the inspection parameter group corresponding to the selected calculation result, and an obtained calculation result is displayed on the GUI.

17. A scanning electron microscope comprising the defect inspection tool according to the items 1 to 16.

18. A method of tuning an inspection parameter group used when detecting a defect in a defect inspection tool, comprising:
an image obtaining step of obtaining an image by applying an electron beam to a specimen;
a step of performing a calculation process by using each predetermined inspection parameter group based on the image obtained by the step;
a step of determining an effective inspection parameter group from calculation results by the calculation process; and
a step of narrowing down an inspection parameter group range by repeating the step of determining the effective inspection parameter group for a plurality of images obtained by the image obtaining step.

19. A method of tuning an inspection parameter group used when detecting a defect in a defect inspection tool, comprising:
an image obtaining step of obtaining an image by applying an electron beam to a specimen;
a detecting step of performing a calculation process by using each predetermined inspection parameter group based on the image obtained by the image obtaining step, and detecting each defect detection image for each inspection parameter group;
a displaying step of displaying a list of each defect detection image detected by the detecting step;
a selecting step of selecting one defect detection image from each of defect detection images displayed as a list;
a step of determining an effective inspection parameter group range from each defect detection image detected by the detecting step based on the selected defect detection image; and
a step of narrowing down the inspection parameter group by repeating the step for a plurality of images obtained by the image obtaining step.

20. The method of tuning the inspection parameter group according to the item 19, wherein the step of determining the effective inspection parameter group range is a step to judge whether an area, a central coordinate, an aspect ratio and/or a concavo-convex shape of a defect detection area of each defect detection image displayed as a list by the displaying step are within predetermined ranges based on the area, the central coordinate, the aspect ratio and/or the concavo-convex shape of the defect detection area of the defect detection image selected by the selecting step, and to determine that the inspection parameter group for the defect detection image having the defect detection area within the predetermined area to be within the effective range.

21. A method of tuning an inspection parameter group used when detecting a defect in a defect inspection tool, comprising:
an image obtaining step of obtaining an image by applying an electron beam to a specimen;
a detecting step of performing a calculation process by using each predetermined inspection parameter group based on the image obtained by the image obtaining step to detect calculation results for each inspection parameter group;

a teaching step of teaching a defect area included in the image based on the image obtained by the image obtaining step;
a step of determining an effective inspection parameter group range from the calculation results detected by the detecting step based on the defect area taught by the teaching step; and
a step of narrowing down the inspection parameter group by repeating the step for a plurality of images obtained by the image obtaining step.

22. The method of tuning the inspection parameter group according to the item 21, wherein the step of determining the effective inspection parameter group range is a step of judging whether an area, a central coordinate, an aspect ratio and/or a concavo-convex shape of each defect detection area of the calculation results for each inspection parameter group detected by the detecting step are within predetermined ranges based on the area, the central coordinate, the aspect ratio and/or the concavo-convex shape of the defect area taught by the teaching step and of determining that the inspection parameter group for the calculation result having the defect detection area within the predetermined ranges to be within the effective range.

23. The method of tuning the inspection parameter group according to the item 21 or 22, wherein the teaching step is performed by drawing a figure enclosing a defect portion included in the image displayed on a GUI, by drawing the defect area of the defect portion included in the image, or by extracting the defect area of the defect portion included in the image by image processing, by using the GUI for displaying the image obtained by the image obtaining step.

24. The method of tuning the inspection parameter group according to any one of the items 18 to 23, wherein the step of narrowing down the inspection parameter groups is a step of overlaying effective inspection parameter group ranges determined by the step of determining the inspection parameter group range for a plurality of images obtained by the image obtaining step, respectively, and narrowing down the inspection parameter group range to a range on which the ranges are overlaid the most.

25. The method of tuning the inspection parameter group according to any one of the items 18 to 24, having steps of changing an inspection parameter, adding the inspection parameter, or tuning a value of the inspection parameter, of each inspection parameter group used when performing the calculation process, and performing the calculation process by using each inspection parameter group changed, added, and tuned by the steps, thereby determining again effective inspection parameter group from the obtained calculation results.

26. The method of tuning the inspection parameter group according to any one of the items 18 to 25, comprising a displaying step of displaying a list of the calculation results obtained by the calculation process by the GUI.

27. The method of tuning the inspection parameter group according to the item 19 or 20, wherein each defect detection image is displayed as a list in the displaying step by a GUI, and a step of selecting the defect detection image by the selecting step is performed by using the GUI.

28. The method of tuning the inspection parameter group according to the item 26 or 27, wherein when specifying or selecting the calculation result displayed as a list in the displaying step, the specified or selected calculation result is displayed in an enlarged manner.

29. The method of tuning the inspection parameter group according to any one of the items 26 to 28, having a step of selecting whether the image obtained by the image obtaining step is to be synthesized with each defect detection image being the calculation results obtained by performing the calculation process based on the image and the synthesized image is to be displayed by the GUI, and when displaying is selected at the step, the image and each defect detection image are synthesized with each other to be displayed.

30. The method of tuning the inspection parameter group according to any one of the items 26 to 29, wherein the list display by the GUI in the displaying step is to display the list of the calculation results obtained by performing the calculation process based on the image obtained by the image obtaining step and to simultaneously display the calculation result obtained by performing the calculation process based on an image different from the image obtained by the image obtaining step, and
when one of the calculation results displayed as a list using the GUI is selected, the calculation result based on the simultaneously displayed different image is calculated based on the different image using the inspection parameter group corresponding to the selected calculation result, and is changed with the calculation result obtained by the calculation process.

31. The method of tuning the inspection parameter group according to any one of the items 26 to 29, wherein in the GUI for displaying a list of the calculation results obtained by the calculation process based on the image obtained by the image obtaining process, when one calculation result is selected from the list display by using the GUI, an image different from the image is calculated by the image processing unit using an inspection parameter group corresponding to the selected calculation result and an obtained calculation result is displayed.

| Description of reference numerals | |
|---|---|
| 100 | defect inspection tool |
| 101 | electron gun |
| 102 | lens |
| 103 | deflector |
| 104 | objective lens |
| 105 | specimen |
| 106 | specimen stage |
| 107 | electron beam |
| 108 | secondary electron |
| 109 | backscattered electron |
| 110 | lens control circuit |
| 111 | deflection control circuit |
| 112 | objective lens control circuit |
| 113 | analog/digital converter |
| 114 | address control circuit |
| 115 | image memory |
| 116 | mechanical control circuit |
| 117 | display means |
| 118 | controlling means |
| 119 | image processing means |
| 120 | input means |
| 122 | secondary electron detector |
| 123 | backscattered electron detector |
| 124 | motion stage |
| 307 | defect detection image |
| 308 | defect detection area |
| 309 | detection result |
| 310 | cursor |
| 401 | numerical value |
| 402 | defect detection image |
| 501 to 504 | range |
| 505 | screen |
| 506 | overlaid range |
| 600 | list display screen |
| 601 | list screen |

-continued

| Description of reference numerals | |
|---|---|
| 602 | defect detection image |
| 603 | frame |
| 605 | scroll key |
| 702 | defect image |
| 703 | detection result |
| 707 | button |
| 801 | image |
| 902 | another window |
| 903 | another screen |
| 1001 | character |
| 1102 | list display |
| 1103 | list display |
| 1201 | icon |
| 1303 | detection result |
| 1304 | detection result |
| 1601 | window and chart, comment |
| 1602 | display |
| 1801 | display screen |
| 1802 | display screen |
| 1803 | image |
| 1804 | defect portion |
| 1805 | circle |
| 1806 | cursor |
| 1807 to 1809 | icon |
| 1811 | image |
| 1812 | input means |
| 1814 | defect portion |
| 1824 | defect portion |
| 1827 | defect area |

What is claimed is:

1. A defect inspection tool, comprising:
an image obtaining unit for obtaining an image by applying an electron beam or a light to a specimen;
an image processing unit for performing a calculation process by using a plurality of predetermined inspection parameter groups for the image obtained by the image obtaining unit to output a plurality of defect detection images;
a display unit for displaying a plurality of defect detection images as a list outputted by the image processing unit;
an input unit for a user to select a defect detection image through appropriate defect detection from the displayed list of defect detection images displayed;
a parameter group range determining unit for determining an effective inspection parameter group range on the basis of a first defect detection area which is included in the defect detection image selectively inputted at the input unit and a second defect detection area which is included in each defect detection image displayed in the list; and
a parameter tuning unit for narrowing down the inspection parameter group range for a plurality of images obtained by the image obtaining unit by using a plurality of effective inspection parameter group ranges and storing the narrowed inspection parameter group range.

2. The defect inspection tool according to claim 1, further comprising an element for changing, adding, or tuning the inspection parameter of each inspection parameter group used when performing the calculation process in the image processing unit.

3. The defect inspection tool according to claim 1, wherein said display unit displays a specified or selected defect detection image in an enlarged manner by specifying or selecting the defect detection image displayed in the list.

4. The defect inspection tool according to claim 1, wherein said display unit synthesizes the image obtained by the image obtaining unit with the defect detection image obtained by performing the calculation process by the image processing unit and displays the synthesized image.

5. A method of tuning an inspection parameter group used when detecting a defect in a defect inspection tool, the method comprising steps of:
obtaining an image by applying an electron beam or a light to a specimen;
processing the obtained image by using a plurality of predetermined inspection parameter groups for the obtained image to output a plurality of defect detection images;
displaying a list of plurality of defect detection images outputted during the image processing step;
determining an effective inspection parameter group range on the basis of a first defect detection area which is included in the defect detection image selected through an input unit, by a user, from the defect detection images displayed in the list, and a second defect detection area which is included in each defect detection image displayed in the list; and
narrowing down an inspection parameter group range for a plurality of images obtained by the image obtaining step by using a plurality of effective inspection parameter group ranges and storing the narrowed inspection parameter group range.

6. The defect inspection tool according to claim 1, wherein said parameter group range determining unit judges whether an area, a central coordinate, an aspect ratio and/or a concavo-convex shape of the first defect detection area in each defect detection image displayed in the list are within a predetermined range or not, based on the area, the central coordinate, the aspect ratio and/or the concavo-convex shape of the second defect detection area in the defect detection image selected by the user of the input unit, and to determine the effective inspection parameter group range by using the inspection parameter groups having the first defect detection area within the predetermined range.

7. A defect inspection tool, comprising:
an image obtaining unit for obtaining an image by applying an electron beam or light to a specimen;
an image processing unit for performing a calculation process by using a plurality of predetermined inspection parameter groups for the obtained image to output a plurality of calculation results;
an input unit, for a user, for identifying a defect area using said obtained image;
a parameter group range determining unit for determining an effective inspection parameter group range on the basis of the defect area which is identified by the input unit and the calculation results outputted by the image processing unit; and
a parameter tuning unit for narrowing down the inspection parameter group range by using a plurality of effective inspection parameter group ranges which are obtained by the parameter group range determining unit for a plurality of images obtained by the image obtaining unit and for storing the narrowed inspection parameter group range.

8. The defect inspection tool according to the item 7, wherein said parameter group range determining unit judges whether an area, a central coordinate, an aspect ratio and/or a concavo-convex shape of the defect detection area in each of the calculation results obtained in the calculation process are within a predetermined range based on the area, the central coordinate, the aspect ratio and/or the concavo-convex shape of the defect area associated by the input unit, and to determine an effective inspection parameter group range by using the inspection parameter groups used in the calculation process of the defect detection image having the defect detection area within the predetermined range.

9. A method of tuning an inspection parameter group used when detecting a defect in a defect inspection tool, the method comprising steps of:
   obtaining an image by applying an electron beam or a light to a specimen;
   processing an image by using a plurality of predetermined inspection parameter groups for the obtained image to output a plurality of calculation results;
   displaying the obtained image;
   determining an effective inspection parameter group range for the displayed image on the basis of a defect detection area which is identified by an input unit of said defect inspection tool and each calculation result outputted; and
   narrowing down the inspection parameter group range for a plurality of images by using a plurality of obtained effective inspection parameter group ranges and storing the narrowed inspection parameter group range.

* * * * *